US010440452B2

(12) United States Patent
Mach et al.

(10) Patent No.: US 10,440,452 B2
(45) Date of Patent: Oct. 8, 2019

(54) APPARATUS AND METHOD FOR TRANSMITTING AND RECEIVING ENVIRONMENTAL INFORMATION IN WIRELESS COMMUNICATION SYSTEM

(71) Applicant: SAMSUNG ELECTRONICS CO., LTD., Suwon-si, Gyeonggi-do (KR)

(72) Inventors: Tomasz Henryk Mach, Middlesex (GB); David Gutierrez Estevez, Middlesex (GB)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 0 days.

(21) Appl. No.: 15/612,568

(22) Filed: Jun. 2, 2017

(65) Prior Publication Data
US 2017/0353777 A1 Dec. 7, 2017

(30) Foreign Application Priority Data

Jun. 3, 2016 (GB) .................................. 1609780.0
May 24, 2017 (KR) ........................ 10-2017-0064170

(51) Int. Cl.
*H04Q 9/02* (2006.01)
*H04W 4/02* (2018.01)
(Continued)

(52) U.S. Cl.
CPC .............. *H04Q 9/02* (2013.01); *G08B 21/12* (2013.01); *H04W 4/027* (2013.01); *H04W 4/38* (2018.02);
(Continued)

(58) Field of Classification Search
CPC ...................................................... H04Q 9/02
(Continued)

(56) References Cited

U.S. PATENT DOCUMENTS

2007/0299587 A1* 12/2007 Breed .................. B60R 21/013
701/45
2012/0296567 A1* 11/2012 Breed .................... G01C 21/26
701/468
(Continued)

FOREIGN PATENT DOCUMENTS

KR    10-2016-0040911    4/2016
WO    WO 2015-160830    10/2015

OTHER PUBLICATIONS

Bumgardner, "Air Pollution Linked to Significant Decrease in Life Expectancy", Health, http://www.scientificamerican.com/article/air-pollution-linked-to-health/ , Jul. 10, 2013, 4 pages.
(Continued)

*Primary Examiner* — Santiago Garcia
(74) *Attorney, Agent, or Firm* — Nixon & Vanderhye P.C.

(57) ABSTRACT

The present disclosure relates to a sensor network, machine type communication (MTC), machine-to-machine (M2M) communication, and technology for internet of things (IoT). The present disclosure may be applied to intelligent services based on the above technologies, such as smart home, smart building, smart city, smart car, connected car, health care, digital education, smart retail, security and safety services. A transmitting apparatus according to an embodiment of the present disclosure is provided. The transmitting apparatus includes a transmitter, and a processor configured to acquire at least one of information related to air pollution and information related to a noise through a sensor included in the transmitting apparatus or an external sensor, and to control the transmitter to transmit the at least one of the information related to the air pollution and the information related to the noise.

19 Claims, 9 Drawing Sheets

(51) Int. Cl.
 G08B 21/12 (2006.01)
 H04W 4/38 (2018.01)
(52) U.S. Cl.
 CPC ..... G08C 2201/93 (2013.01); H04Q 2209/40 (2013.01); H04Q 2209/50 (2013.01); H04Q 2209/826 (2013.01)
(58) Field of Classification Search
 USPC .................................................. 340/870.03
 See application file for complete search history.

(56) References Cited

U.S. PATENT DOCUMENTS

| | | | | |
|---|---|---|---|---|
| 2012/0313791 | A1* | 12/2012 | Mehta | G01N 21/17 340/870.01 |
| 2013/0038470 | A1* | 2/2013 | Niemeyer | H04Q 9/00 340/870.11 |
| 2014/0229255 | A1* | 8/2014 | Scofield | G06Q 30/0207 705/14.21 |
| 2015/0253300 | A1* | 9/2015 | Zanfei | G01N 33/0075 702/24 |
| 2015/0379400 | A1 | 12/2015 | Tatourian et al. | |
| 2016/0290979 | A1* | 10/2016 | Cogill | G01N 33/0004 |
| 2017/0222612 | A1* | 8/2017 | Zollner | G08G 1/167 |
| 2017/0272338 | A1* | 9/2017 | Borrel | H04L 43/045 |
| 2017/0337287 | A1* | 11/2017 | Gill | G06N 5/04 |
| 2018/0004211 | A1* | 1/2018 | Grimm | G01C 21/3407 |
| 2018/0025549 | A1* | 1/2018 | King | G07B 15/02 340/870.02 |

OTHER PUBLICATIONS

Vaughan, "UK Cities will exceed EU pollution limited until 2030, figures show", The Guardian, http://www.theguardian.com/environment/2014/jul/10/uk-cities-breach-eu-pollution-limits-2030, Jul. 10, 2014, 5 pages.
CIMEC Findings from the CIMEC City Requirements Survey, 16 pages.
Fruin, Car ventilation choices can reduce pollution exposure, study finds:, USC News, Health, https://news.usc.edu/55000/car-ventilation-choices-can-reduce-pollution-exposure-study-finds Sep. 11, 2013, 3 pages.
Hotten, "Volkswagen: The scandal explained", BBC News, http://www.bbc.co.uk/news/business-34324772, Dec. 10, 2015, 10 pages.
"Explaining road transport emissions, A not-technical guide", European Environment Agency, 2016, 31 pages.
Intelligent Transport Systems (ITS);Vehicular Communications; Basic Set of Applications; Part 2: Specification of Cooperative Awareness Basic Service, (ETSI EN 302 637-2), V1.3.2, Nov. 2014, 44 pages.
Wikipedia entry: https://en.m.wikipedia.org/wiki/Atmospheric_dispersion_modeling#Gaussian_air_pollutant_dispersion_equation, 17 pages.
"Atmospheric Dispersion Calculator, Air Pollution Control Stacks Equation Formulas: Solving for contaminant concentration at ground level along the plume centerline when the emission source is at ground level", http://www.ajdesigner.com/phpdispersion/point_space_equation.php#ajscroll, 5 pages.
Atmospheric Dispersion Calculator, Air Pollution Control Stacks Equation Formulas, Solving for contaminant concentration at ground level along the plume centerline when the emission source is at ground level, http://www.ajdesigner.com/phpdispersion/emission_source_ground_equation.php, 6 pages.
Air Quality Legislation—http://ec.europa.eu/environment/archives/enlarg/handbook/air.pdf, 226 pages.
3GPP TR 22.885 Study on LTE support for Vehicle to Everything (V2X) services, Dec. 2015, 50 pages.
Scholliers et al., "Integration of vulnerable road users in cooperative ITS systems", Eur. Transp. Res. Rev, Mar. 23, 2017 9:15, 9 pages.

* cited by examiner

Atmospheric Disperdion Calculator
Air Pollution Control Stacks Equation Formulas
Solving for plume contaminant concentration at a point in space $$C(x,y,z) = \frac{Q}{2\pi u \sigma_y \sigma_z} e^{-\frac{y^2}{2\sigma_y^2}} \left( e^{-\frac{(z+H)^2}{2\sigma_z^2}} + e^{-\frac{(z-H)^2}{2\sigma_z^2}} \right)$$

Inputs :

| | | |
|---|---|---|
| pollution rate emission rate(Q) | | gram/second ▼ |
| average wind speed (u) | | meter/second ▼ |
| y direction plume standard deviation ($\sigma_y$) | | meter ▼ |
| z direction plume standard deviation ($\sigma_z$) | | meter ▼ |
| y position (y) | | meter ▼ |
| z position (z) | | meter ▼ |
| effective stach height (H) | | meter ▼ |

FIG.9

APPARATUS AND METHOD FOR TRANSMITTING AND RECEIVING ENVIRONMENTAL INFORMATION IN WIRELESS COMMUNICATION SYSTEM

CROSS-REFERENCE TO RELATED APPLICATIONS

The present application is based on and claims the priority under 35 U.S.C. § 119 to Great Britain patent application No. 1609780.0 filed on Jun. 3, 2016 in the United Kingdom Intellectual Property Office, and to Korean patent application No. 10-2017-0064170 filed on May 24, 2017 in the Korean Intellectual Property Office, the disclosures of which are incorporated by reference herein in their entireties.

TECHNICAL FIELD

The present disclosure relates generally to an apparatus and method for transmitting and receiving environmental information in a wireless communication system. For example, the present disclosure relates generally to an apparatus and method for transmitting and receiving environmental information based on a plurality of environmental information sources.

BACKGROUND

The Internet, which is a human centered connectivity network where humans generate and consume information, is now evolving to the internet of things (IoT) where distributed entities, such as things, exchange and process information without human intervention. The internet of everything (IoE), which is a combination of the IoT technology and the big data processing technology through connection with a cloud server, has emerged.

As technology elements, such as "sensing technology", "wired/wireless communication and network infrastructure", "service interface technology", and "security technology" have been demanded for IoT implementation, a sensor network, a machine-to-machine (M2M) communication, machine type communication (MTC), and so forth have been recently researched.

Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing information technology (IT) and various industrial applications.

Poor air quality may typically be considered a public health problem as long-term exposure, for example by humans, animals and/or plants, to polluted air may be detrimental. For example, poor air quality may have negative health effects on humans: lung ageing may be accelerated, lung capacity may decrease and/or functionality impaired; asthma, bronchitis, emphysema or cancer may develop; and/or life span may be reduced. Road transport, for example vehicles such as passenger vehicles such as motorbikes, cars, or buses or goods vehicles such as lorries, may be significant sources of pollution such as air pollution, greenhouse effect gases and/or noise pollution. Despite enhancements in vehicle efficiencies, the automotive sector may still be responsible for a very significant portion of pollution caused to the environment. As an example, in Europe, road transport or vehicles account for almost one fifth of Europe's green house gas emissions, and many European cities suffer a concentration of air pollutants that exceed European Union standards.

For example, air pollutants from vehicles, such as carbon dioxide, carbon monoxide or nitrogen oxides, along with traffic noise, are considered challenging aspects of urban transport systems. Congested city traffic scenarios such as traffic jams may be especially critical, and may affect public health in at least two different ways. For example, vulnerable road users (VRUs) such as pedestrians, cyclists, and motorbike users in city traffic may be exposed to relatively higher risks of pollution due to their physical location close (i.e. proximity) to vehicle exhausts and lack of air filtering systems, such as cabin air filtering systems that may be included in vehicles. For example, vehicle drivers and/or passengers may be exposed, intermittently or continuously, to relatively higher pollution levels without information about these pollution levels and hence may be exposed to corresponding health risks. Vehicle cabin air filtering systems and/or cabin air recirculation systems may reduce pollution exposure, but may not be available or operational in all vehicles.

Furthermore, current pollution regulatory measures may not be complied with, for example by the transport sector such as vehicle manufacturers, and/or may only apply to currently manufactured vehicles. Provision of effective solutions to pollution problems may be limited by a complexity of measuring vehicle emissions and/or current exhaust emission testing approaches may not be effective. While standardised measurements in laboratories may be typically used to measure that vehicles meet, for example, regulated limits for exhaust emissions, official measurement procedures may not be representative of actual vehicle use, for example, real driving conditions.

Hence, there is a need to improve monitoring of the environment, particularly with respect to pollution due to vehicles. The above information is presented as background information only to assist with an understanding of the present disclosure. No determination has been made, and no assertion is made, as to whether any of the above might be applicable as prior art with regard to the present disclosure.

SUMMARY

An example embodiment of the present disclosure provides an apparatus and method for transmitting and receiving environmental information in a wireless communication system.

An example embodiment of the present disclosure provides an apparatus and method for transmitting and receiving environmental information based on a plurality of environmental information sources in a wireless communication system.

An example embodiment of the present disclosure provides an apparatus and method for transmitting and receiving environmental information thereby enabling a vehicle crowdsourcing in which environmental information is shared in a wireless communication system.

An example embodiment of the present disclosure provides an apparatus and method for transmitting and receiving environmental information thereby enabling a vehicle crowdsourcing in which environmental information is shared and an action which is based on the environmental information is performed in a wireless communication system.

An example embodiment of the present disclosure provides an apparatus and method for transmitting and receiving environmental information such that a receiving apparatus may estimate environmental information of the receiving apparatus based on environmental information transmitted in transmitting apparatuses in a wireless communication system.

An example embodiment of the present disclosure provides environmental monitoring apparatus and method which at least partially obviate or mitigate at least some of the disadvantages of the prior art, whether identified herein or elsewhere. For example, an embodiment of the present disclosure provides an apparatus and method for transmitting and receiving environmental information thereby enabling a vehicle crowdsourcing in which the environmental information may be shared and actions may be performed in response to pollution exposure in a wireless communication system. According to an example embodiment of the present disclosure, environmental monitoring performance may be improved. In accordance with an example aspect of the present disclosure, a transmitting apparatus is provided. The transmitting apparatus includes a transmitter, and a processor configured to acquire at least one of information related to air pollution and information related to a noise through a sensor included in the transmitting apparatus or an external sensor, and to control the transmitter to transmit the at least one of the information related to the air pollution and the information related to the noise.

In accordance with another example aspect of the present disclosure, a receiving apparatus is provided. The receiving apparatus includes a receiver, and a processor configured to control the receiver to receive at least one of information related to air pollution and information related to a noise from each of at least two transmitting apparatuses, and to estimate at least one of information related to air pollution and information related to a noise of the receiving apparatus based on the at least one of the information related to the air pollution and the information related to the noise which is received from each of the at least two transmitting apparatuses.

In accordance with still another example aspect of the present disclosure, a method of a transmitting apparatus is provided. The method includes acquiring at least one of information related to air pollution and information related to a noise through a sensor included in the transmitting apparatus or an external sensor; and transmitting the at least one of the information related to the air pollution and the information related to the noise.

In accordance with still another example aspect of the present disclosure, a method of a receiving apparatus is provided. The method includes receiving at least one of information related to air pollution and information related to a noise from each of at least two transmitting apparatuses, and estimating at least one of information related to air pollution and information related to a noise of the receiving apparatus based on the at least one of the information related to the air pollution and the information related to the noise which is received from each of the at least two transmitting apparatuses.

Another example aspect of the present disclosure provides a transmitter device comprising a transmitter;
wherein the transmitter device is configured to obtain first environmental information; and
wherein the transmitter device is configured to control the transmitter to transmit the first environmental information.

Yet another example aspect of the present disclosure provides a transceiver device comprising a receiver;
wherein the transceiver device is configured to control the receiver to receive first environmental information and second environmental information; and
wherein the transceiver device is configured to combine the first environmental information and the second environmental information.

Still another example aspect of the present disclosure provides a transceiver device comprising a transmitter and a receiver;
wherein the transceiver device is configured to obtain first environmental information;
wherein the transceiver device is configured to control the receiver to receive second environmental information; and
wherein the transceiver device is configured to combine the first environmental information and the second environmental information.

Another example aspect of the present disclosure provides a method of transmitting information, the method comprising:
obtaining first environmental information; and
transmitting the first environmental information.

A further example aspect of the present disclosure provides a method of receiving information, the method comprising:
receiving first environmental information and second environmental information; and
combining the first environmental information and the second environmental information.

Another aspect of the present disclosure provides a method of transceiving information, the method comprising:
obtaining first environmental information;
receiving second environmental information; and
combining the first environmental information and the second environmental information.

A still further example aspect of the present disclosure provides a network comprising a transmitter device and a receiver device.

Yet another example aspect of the present disclosure provides a receiver device comprising a receiver;
wherein the receiver device is configured to control the receiver to receive first environmental information; and
wherein the receiver device is configured to determine a pollution exposure based on the first environmental information.

Another example aspect of the present disclosure provides a method of receiving information, the method comprising:
receiving first environmental information; and
determining a pollution exposure based on the first environmental information.

Other aspects, advantages, and salient features of the disclosure will become apparent to those skilled in the art from the following detailed description, which, taken in conjunction with the annexed drawings, discloses example embodiments of the disclosure.

Before undertaking the detailed description below, it may be advantageous to set forth various definitions of certain words, terms and phrases used throughout this patent document: the terms "include" and "comprise," as well as derivatives thereof, refer, for example, to inclusion without limitation; the term "or," is inclusive, meaning and/or; the phrases "associated with" and "associated therewith, "as well as derivatives thereof, may denote to include, be included within, interconnect with, contain, be contained within, connect to or with, couple to or with, be communicable with, cooperate with, interleave, juxtapose, be proximate to, be bound to or with, have, have a property of, or the like; and the term "controller" may refer, for example, to any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this disclosure, and those of ordinary skill in the art should understand that in many, if not most instances, such definitions apply to prior, as well as future uses of such defined words and phrases.

BRIEF DESCRIPTION OF THE DRAWINGS

The above and other aspects, features and attendant advantages of the present disclosure will be more readily understood and appreciated from the following detailed description, taken in conjunction with the accompanying drawings, in which like reference numerals refer to like elements, and wherein:

FIG. 9 is a diagram illustrating an example process of modelling a pollution exposure in an example receiver device in a wireless communication system according to an example embodiment of the present disclosure;

Throughout the drawings, it should be noted that like reference numbers are used to depict the same or similar elements, features, and structures.

DETAILED DESCRIPTION

Figure 1:
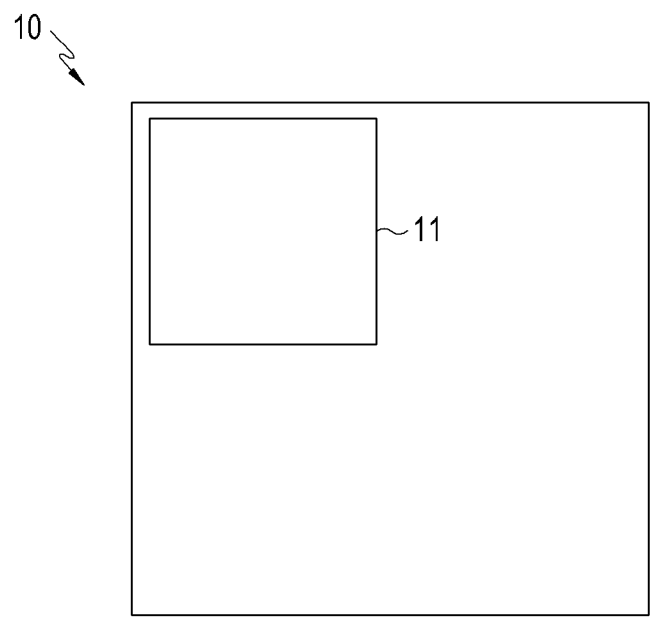
FIG. 1 is a diagram illustrating an example of an inner structure of a transmitter device in a wireless communication system according to an example embodiment of the present disclosure.

The following detailed description is made with reference to the accompanying drawings and is provided to assist in a comprehensive understanding of various example embodiments of the present disclosure. It includes various specific details to assist in that understanding but these are to be regarded as merely examples. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, arbitrarily selected to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Although ordinal numbers such as "first," "second," and so forth will be used to describe various components, those components are not limited herein. The terms are used only for distinguishing one component from another component. For example, a first component may be referred to as a second component and likewise, a second component may also be referred to as a first component, without departing from the teaching of the disclosure. The term "and/or" used herein includes any and all combinations of one or more of the associated listed items.

The terminology used herein is for the purpose of describing various embodiments only and is not intended to be limiting. As used herein, the singular forms are intended to include the plural forms as well, unless the context clearly indicates otherwise. It will be further understood that the terms "comprises" and/or "has," when used in this disclosure, specify the presence of a stated feature, number, step, operation, component, element, or combination thereof, but do not preclude the presence or addition of one or more other features, numbers, steps, operations, components, elements, or combinations thereof.

The terms used herein, including technical and scientific terms, have the same meanings as terms that are generally understood by those skilled in the art, as long as the terms are not differently defined. It should be understood that terms defined in a generally-used dictionary have meanings coinciding with those of terms in the related technology.

According to various embodiments of the present disclosure, an electronic device may include communication functionality. For example, an electronic device may be a smart phone, a tablet personal computer (PC), a mobile phone, a video phone, an e-book reader, a desktop PC, a laptop PC, a netbook PC, a personal digital assistant (PDA), a portable multimedia player (PMP), an mp3 player, a mobile medical device, a camera, a wearable device (e.g., a head-mounted device (HMD), electronic clothes, electronic braces, an electronic necklace, an electronic appcessory, an electronic tattoo, or a smart watch), or the like, but is not limited thereto.

According to various embodiments of the present disclosure, an electronic device may be a smart home appliance with communication functionality. A smart home appliance may be, for example, a television, a digital video disk (DVD) player, an audio, a refrigerator, an air conditioner, a vacuum cleaner, an oven, a microwave oven, a washer, a dryer, an air purifier, a set-top box, a TV box (e.g., Samsung HomeSync™, Apple TV™, or Google TV™), a gaming console, an electronic dictionary, an electronic key, a camcorder, an electronic picture frame, or the like, but is not limited thereto.

According to various embodiments of the present disclosure, an electronic device may be a medical device (e.g., magnetic resonance angiography (MRA) device, a magnetic resonance imaging (MRI) device, computed tomography (CT) device, an imaging device, or an ultrasonic device), a navigation device, a global positioning system (GPS) receiver, an event data recorder (EDR), a flight data recorder (FDR), an automotive infotainment device, a naval electronic device (e.g., naval navigation device, gyroscope, or compass), an avionic electronic device, a security device, an industrial or consumer robot, or the like, but is not limited thereto.

According to various embodiments of the present disclosure, an electronic device may be furniture, part of a building/structure, an electronic board, electronic signature receiving device, a projector, various measuring devices (e.g., water, electricity, gas or electro-magnetic wave measuring devices), or the like that include communication functionality, but is not limited thereto.

According to various embodiments of the present disclosure, an electronic device may be any combination of the foregoing devices. In addition, it will be apparent to one having ordinary skill in the art that an electronic device according to various embodiments of the present disclosure is not limited to the foregoing devices.

According to an embodiment of the present disclosure, a transmitter device, a receiver device and a transceiver device are provided as set forth in the appended claims. Also provided is a method of transmitting information, a method of receiving information and a method of transceiving information are provided. Other features of the present disclosure will be apparent from the claims, and the description that follows.

Throughout this disclosure, the term "comprising" or "comprises" means including the component(s), unit(s), module(s), feature(s) or integer(s) specified but not to the exclusion of the presence of other components, units, modules, features or integers.

The term "consisting of" or "consists of" means including the component(s), unit(s), module(s), feature(s) or integer(s) specified but excluding other components, units, modules, features or integers.

The optional features set out herein may be used either individually or in combination with each other where appropriate and particularly in the combinations as set out in the accompanying claims. The optional features for each aspect or example embodiment of the present disclosure, as set out herein are also applicable to all other aspects or example embodiments of the present disclosure, where appropriate. In other words, the skilled person reading this disclosure should consider the optional features for each aspect or example embodiment of the present disclosure as interchangeable and combinable between different aspects and example embodiments.

According to various embodiments of the present disclosure, each of a transmitter device, a receiver device, and a transceiver device may be, for example, a vehicle device. The vehicle device may be a device which is installed or mounted on a vehicle.

In various embodiments of the present disclosure, the term transmitter device may be interchangeable with the term transmitting apparatus, the term receiver device may be interchangeable with the term receiving apparatus, and the term transceiver device may be interchangeable with the term transceiving apparatus.

According to various embodiments of the present disclosure, each of a transmitter device, a receiver device, and a transceiver device may be, for example, an infrastructure device. The infrastructure device may be a device which is installed in or included in an infrastructure. The infrastructure device may be, for example, a base station (BS). The term BS may be interchangeable with the terms access point (AP), node B, evolved node B (eNB), evolved universal terrestrial radio access network (E-UTRAN) node B (eNB), and/or the like.

According to various embodiments of the present disclosure, each of a transmitter device, a receiver device, and a transceiver device may be, for example, a user device. The user device may be a device which a user, e.g., a pedestrian carries. The infrastructure device may be, for example, a base station (BS). The term user device may be interchangeable with the terms terminal, device, wireless device, mobile device, mobile station (MS), and/or the like. An embodiment of the present disclosure proposes an apparatus and method for transmitting and receiving environmental information in a wireless communication system.

An example embodiment of the present disclosure provides an apparatus and method for transmitting and receiving environmental information based on a plurality of environmental information sources in a wireless communication system.

An example embodiment of the present disclosure provides an apparatus and method for transmitting and receiving environmental information thereby enabling a vehicle crowdsourcing in which environmental information is shared in a wireless communication system.

An example embodiment of the present disclosure provides an apparatus and method for transmitting and receiving environmental information thereby enabling a vehicle crowdsourcing in which environmental information is shared and an action which is based on environmental information is performed in a wireless communication system.

An example embodiment of the present disclosure provides an apparatus and method for transmitting and receiving environmental information thereby enabling a vehicle crowdsourcing in which the environmental information may be shared and actions may be performed in response to pollution exposure in a wireless communication system.

An example apparatus and method provided in an example embodiment of the present disclosure may be applied to various communication systems such as a long term evolution (LTE) mobile communication system, an LTE-advanced (LTE-A) mobile communication system, a licensed-assisted access (LAA)-LTE mobile communication system, a high speed downlink packet access (HSDPA) mobile communication system, a high speed uplink packet access (HSUPA) mobile communication system, a high rate packet data (HRPD) mobile communication system proposed in a $3^{rd}$ generation partnership project 2 (3GPP2), a wideband code division multiple access (WCDMA) mobile communication system proposed in the 3GPP2, a code division multiple access (CDMA) mobile communication system proposed in the 3GPP2, an institute of electrical and electronics engineers (IEEE) 802.16m communication system, an IEEE 802.16e communication system, an evolved packet system (EPS), and a mobile internet protocol (Mobile IP) system, a digital video broadcast system such as a mobile broadcast service such as a digital multimedia broadcasting (DMB) service, a digital video broadcasting-handheld (DVP-H), an advanced television systems committee-mobile/handheld (ATSC-M/H) service, and the like, and an internet protocol television (IPTV), a moving picture experts group (MPEG) media transport (MMT) system and/or the like.

an example aspect of the present disclosure provides a transmitter device comprising a transmitter;

wherein the transmitter device is configured to obtain environmental information; and wherein the transmitter device is configure to control the transmitter to transmit the environmental information.

In various example embodiments of the present disclosure, it will be noted that, for example, if each of the first transmitter device and the second transmitter device transmits environmental information, the environmental information transmitted by the first transmitter device may be referred to as the first environmental information, and the environmental information transmitted by the second transmitter device may be referred to as the second environmental information. That is, in various example embodiments of the present disclosure, if each of n transmitter devices transmits environmental information, a receiver device receives the first environmental information to the nth environmental information.

In this way, the environmental information may be shared by the transmitter device with other devices. In this way, a vehicle pollution crowdsourcing, e.g., a vehicle pollution crowdsourcing may be implemented, in which, for example, coordinated utilization of multiple vehicle emission measurements may be shared within a geographic area to obtain reliable estimations of air pollutant concentrations at locations where direct measurement is not available. In this way, pollution mapping may be implemented. In addition, these measurements and/or estimations may be utilized to provide action triggers, for example, to relevant applications used by cooperative intelligent transport systems (C-ITS) ecosystem users such as vehicle to everything (V2X) enabled devices used by vehicles, infrastructure and/or VRUs, in order to monitor, control, reduce and/or minimize human pollution exposure. Vehicle pollution crowdsourcing may be defined as a process by which vehicles share, for example periodically, respective environmental information such as currently generated pollution levels, using, for example, V2X-based ad hoc communication.

In various embodiments of the present disclosure, environmental information may include, for example, information related to air pollution and information related to a noise.

It should be understood that the environmental information may include pollution information, for example atmospheric or air pollution information related to gaseous and/or particulate matter and/or noise levels. In various embodiments of the present disclosure, the environmental information comprises information related to at least one selected from a list including: carbon dioxide ($CO_2$), hydrocarbons (HC), carbon monoxide (CO), particulate matter (PM), nitrogen oxides ($NO_X$), sulphur dioxide ($SO_2$), volatile organic compound (VOC), ozone and noise. The information may be an amount, for example a concentration, a relative concentration (e.g. ppm, ppb), a rate of change of concentration, a rate of emission in g/s or g/km, or a level, for example a noise level in dBa.

It should be understood that the transmitter device may support V2X communication. V2X standard include: European Telecommunications Standard Institute (ETSI) Cooperative Awareness Basic Service (EN 302 637-2); Society of Automotive Engineers (SAE) J2735—dedicated short range communications (DSRC) Message Set Dictionary; and 3GPP TR 22.885 Study on LTE support for V2X services. V2X communication includes vehicle-to-vehicle (V2V), vehicle-to-infrastructure (V2I), and vehicle-to-pedestrian (V2P) communication. For example, the transmitter device may be suitable for or included in a vehicle, infrastructure or a pedestrian device. That is, the transmitter device may be suitable for or included in or near a source of pollution to be monitored. In addition, V2X devices refer to any equipment able to transmit and/or receive V2X messages regardless of the underlying communication technology and independently of other functions that the V2X devices may have. The V2X devices may include, for example, devices fitted or retrofitted to vehicles, devices included in infrastructure such as traffic lights, traffic signs, road gantries and VRU devices such as smartwatches, smartphones, tablets, personal GPS navigation devices or wearable devices. In an example embodiment, the transmitter device comprises a V2X device. In an example embodiment, the transmitter device is a V2X device. In an example embodiment, the first environmental information may be transmitted as a V2X communication.

The transmitter device may control the transmitter to transmit according to a broadcast protocol, for example communication protocols used in C-ITS (e.g. ETSI Cooperative Awareness Basic Service (EN 302 637-2); SAE J2735—DSRC Message Set Dictionary). In an example embodiment, the transmitter device controls the transmitter to transmit according to a C-ITS communication protocol. The C-ITS communication protocols may be modified to include the environmental information.

The transmitter device may obtain the first environmental information from a sensor, for example, at least one of a $CO_2$ sensor, an HC sensor, a CO sensor, a PM sensor, an $NO_X$ sensor, an $SO_2$ sensor, or a noise sensor. The transmitter device may obtain the environmental information directly or indirectly from the at least one sensor. For example, where the transmitter device is included in a vehicle, the transmitter device may obtain the environmental information from the vehicle. For example, the transmitter device may obtain the environmental information from a vehicle engine control unit (ECU), International Organization for Standardization (ISO) controller area network (CAN) bus or on-board diagnostics (OBD) port of the vehicle. The transmitter device may comprise at least one of sensors as described above.

It should be understood that the transmitter may be a wireless transmitter. In an example embodiment, the transmitter comprises a wireless transmitter. The environmental information may be transmitted wirelessly. The environmental information may be transmitted using, for example, and without limitation, a DSCR radio access technology, for example based on ETSI ITS-G5 or IEEE 802.11p standards.

The environmental information may be broadcast by the transmitter device as, for example, and without limitation, a message or as part of a message, such as an ETSI Cooperative Awareness Basic Service (EN 302 637-2); SAE J2735—DSRC Message Set Dictionary. In one example embodiment, the transmitter device controls the transmitter to transmit a message, wherein the message comprises the environmental information. In one example embodiment, the transmitter device controls the transmitter to periodically transmit a message, wherein the message comprises the environmental information. For example, the environmental information may be broadcast periodically, for example, every second, every minute, every hour. In an example embodiment, the environmental information may be broadcasted whenever an event occurs. The event may be implemented with various forms, and may include any cases required for transmitting the environmental information. In an example embodiment, the environmental information may be aperiodically broadcasted. In one example embodiment, the transmitter device controls the transmitter to transmit a message in response to a request to transmit the message.

A periodicity of broadcasting and/or content, for example type or breadth, of the environmental information may be determined by at least one of a vehicle speed, proximity of other vehicles and/or road users, location, environment type, priority or request. For example, where the transmitter device is included in a vehicle, the environmental information may be broadcast below a predetermined speed of the vehicle, such as a typical average vehicle speed in congestion or city traffic. For example, where the transmitter device is included in a vehicle, the environmental information may be broadcast if other vehicles and/or road users are in the proximity of the vehicle, such as if other vehicles and/or road users are detected in a vicinity of the vehicle. For example, the environmental information may be broadcast if a vehicle V2X modem of the vehicle receives V2X signals from other neighbouring vehicles or similar information from other on-board sensors, for example RADAR, LIDAR or camera. For example, where the transmitter device is included in a vehicle, the environmental information may be broadcast according to a map based location and/or type of environment of the vehicle. For example, in high speed motorway and/or rural scenarios, pollution information may be less relevant than compared, for example, with a traffic jam in an urban, city or the pollution control area. For example, where the transmitter device is included in a vehicle, the environmental information may be broadcast according to a C-ITS application priority, such that a priority of the environmental information may be reduced relative, for example, to information related to road traffic and/or safety related. For example, where the transmitter device is included in a vehicle, the environmental information may be broadcast in response to an external request. For example, in a pollution control area, V2X road infrastructure may request passing vehicles to provide the environmental information and the environmental information may be broadcast in response to the request.

The message may include additional information. For example, the message may include location information and/or identifier information of the transmitter device. For example, where the transmitter device is included in a vehicle, the message may include safety critical or operational information, such as vehicle speed, vehicle location, vehicle acceleration, vehicle heading and/or physical vehicle parameters. Such safety critical or operational information may, for example, support C-ITS applications, avoid vehicle collisions, improve transport efficiency and/or comfort and/or support cooperative driving (i.e. vehicle platooning). For example, the message may include atmospheric and/or weather related information, such as temperature, pressure, wind speed, wind direction, humidity or altitude. Additionally and/or alternatively, atmospheric and/or weather related information may be acquired from another provider, such as the Internet.

It should be understood that a typical communication range of DSRC depends on the application and/or the environment but may be up to 300-500 metres. In general, C-ITS applications may be designed to be technology agnostic and hence, the environmental information may be transmitted via any supporting communication technology employed for V2X such as cellular LTE device-to-device (D2D) and/or $5^{TH}$ generation (5G).

Another example aspect of the present disclosure provides a receiver device comprising a receiver;

wherein the receiver device is configured to control the receiver to receive first environmental information and second environmental information; and wherein the receiver device is configured to combine the first environmental information and the second environmental information.

As described above, the first environmental information may refer, for example, to environmental information transmitted by the first transmitter device, and the second environmental information denotes environmental information transmitted by the second transmitter device. That is, the receiver device receives the first environmental information and the second environmental information from at least two transmitter devices, i.e., the first transmitter device and the second transmitter device.

In this way, environmental information from a plurality of sources, for example vehicles, may be combined by the receiver device. In this way, sensors for example pollution sensors may not be required by the receiving device since the first environmental information and the second environmental information is received by the receiver device, thereby reducing a cost and/or size of the receiving device. That is, environmental information may be received, for example, in a location where no pollution measurement is available. In this way, pollution exposure control may be improved, for example for VRUs. In this way, environmental information may be monitored by the receiver device, for example, periodically, aperiodically, or continuously since the environmental information may be received periodically, aperiodically, or continuously from one or more transmitter devices, for example.

The first environmental information and the second environmental information may be environmental information as described previously. That is, each of the first environmental information and the second environmental information may be identical to the environmental information as described above, so a detailed description thereof will not be repeated herein. The receiver may receive a plurality of environmental information.

The receiver device may comprise a control unit. The receiver device may comprise a processor and a memory. The receiver device may comprise a storage. The receiver device may be communicatively coupleable to a remote storage.

The receiver device may combine the first environmental information and the second environmental information by mathematical processing such as arithmetic addition, averaging or weighted averaging. For example, levels of $NO_X$ included in the first environmental information and the second environmental information may be summed. Here, there may be various schemes of combining the first environmental information and the second environmental information, and a detailed description thereof will not be repeated herein.

It should be understood that the receiver device may support V2X communication, as described previously. For example, the receiver device may be suitable for or included in a vehicle, infrastructure or a VRU device. That is, the receiver device may be suitable for or included in or near a source of pollution to be monitored. In an example embodiment, the receiver device comprises a V2X device. In an example embodiment, the receiver device is a V2X device. In an example embodiment, the first environmental information and/or the second environmental information may be received as V2X communications.

The receiver device may control the receiver to receive according to communication protocols used in C-ITS. In an example embodiment, the receiver device controls the receiver to receive according to a C-ITS communication protocol. The communication protocols may be modified to include the first environmental information and/or the second environmental information.

It should be understood that the receiver may be a wireless receiver. In an example embodiment, the receiver comprises a wireless receiver. In an example embodiment, the receiver is a wireless receiver. The first environmental information and/or the second environmental information may be received wirelessly. The first environmental information and/or the second environmental information may be received using, for example, and without limitation, DSCR radio access technology, as described previously. The first environmental information and/or the second environmental information may be received as a message or as part of a message, such as, for example, and without limitation, an ETSI Cooperative Awareness Basic Service (EN 302 637-2) messages; SAE J2735—DSRC Message Set Dictionary. In one example embodiment, the receiver device controls the receiver to receive a message, wherein the message comprises the first environmental information and/or the second environmental information.

In an example embodiment, the receiver device determines, for example evaluates or estimates, a pollution exposure based on the combined first environmental information and second environmental information. The pollution exposure may be determined as described below.

The receiver device may forward the determined pollution exposure, for example to a storage device and/or a remote server which may, for example, aggregate pollution exposures from different receiver devices in different locations or area.

In an example embodiment, the receiver device initiates an action in response to the determined pollution exposure. For example, the receiver device may initiate an action in response to the determined pollution exposure, if the determined pollution exposure is above an expected or normal or predetermined value. For example, the receiver device may initiate an action such as a warning, a response or a notification. For example, where the receiver device is included in a VRU device, a warning may be displayed to a user about a level of negative health impact, for example, low/medium/high compared with normal, such that the user may change route or location to reduce or minimise pollution exposure. In various embodiments of the present disclosure, environmental information and various information which is based on the environmental information are outputted with a display form, however, the environmental information and the various information which is based on the environmental information may be outputted with a different form such as a sound form, and/or the like. For example, where the receiver device is included in a vehicle, a window of the vehicle may be closed, a cabin air recirculation system of the vehicle may be enabled, a motorbike helmet air filter may be enabled, and/or a preventive measure may be enabled to reduce or minimise pollution exposure. For example, where the receiver device is included in infrastructure such as V2I enabled traffic lights, the determined pollution exposure may be displayed to pedestrians.

Further, negative health impact may mean negative impact on health, and may mean, for example, at least one of a case that lung ageing is accelerated, a case that lung capacity decrease, a case that lung functionality is impaired, a case that various diseases such as asthma, bronchitis, emphysema or cancer develop, and/or life span is reduced.

Further, there may be various parameters which negatively impact on health, so the negative health impact may be set based on at least one of the various parameters. If a level of the negative health impact is set to, for example, one of low, medium, and high, a threshold value for identifying each level may be set based on at least one of the various parameters.

In an example embodiment, the receiver device determines the pollution exposure based on the combined first environmental information and second environmental information, according to a model, for example, a pollution dispersion model of the environment.

In an example embodiment, the receiver device determines a distance from a pollution source, based on the first environmental information, the second environmental information and/or the combined first environmental information and second environmental information. For example, the receiver device may determine the distance from a pollution source, for example a vehicle, according to information included in or with the first environmental information and/or the second environmental information. For example, the first environmental information and/or the second environmental information may be included in a message or messages received from one or more transmitter devices, as described above, and the message or the messages may include safety critical or operational information, such as vehicle speed, vehicle location (e.g. based on global positioning system (GPS) coordinates), vehicle acceleration, vehicle heading and/or physical vehicle parameters. The receiver device may estimate, calculate or compute a distance from the pollution source, based on this information, for example vehicle location. The receiver device may estimate, calculate or compute the distance from the pollution source, based on speed, location (e.g. based on GPS coordinates), acceleration, heading and/or vehicle parameters of the receiver device. In this way, a distance from the receiver device to the pollution source may be determined. The determined distance may be used to model a pollution dispersion between the pollution source and the receiver device and/or another pollution exposure location. Additionally and/or alternatively, the distance may be determined by deriving a physical distance according to a radio path loss model based on a transmit power and a receive power. For example, the transmit power may be included in the message received by the receiver device and/or the receiver device may obtain the receive power.

Pollution dispersion in the environment may be modelled mathematically and may consider, for example, gases such as $CO_2$, HC, CO, $NO_xSO_2$, PM, and noise. For example, vehicle generated gases such as $CO_2$ and $NO_x$, may be considered more critical in terms of negative impact on human health, and the pollution exposure may be modelled by the receiver device according to a Gaussian air pollutant dispersion equation, such as described by:

https://en.m.wikipedia.org/wiki/Atmospheric_dispersion_modeling#Gaussian_air_pollutant_dispersion_equation.

Here, Gaussian air pollutant dispersion equation is one of various schemes of modelling pollution exposure, and a detailed description of the schemes of modelling the pollution exposure will not be repeated herein.

Additionally and/or alternatively, the pollution exposure may be modelled by the receiver device according to a simplified Gaussian air pollutant dispersion equation, as described below. Additionally and/or alternatively, the pollution exposure may be modelled by the receiver device according to model adopted to support V2X C-ITS applications. Additionally, for other types of pollution such as PM or noise, the receiver device may model dispersion of such other types of pollution according to other dispersion models. For example, the dispersion modelling may be based on a simple approach, for example assuming uniform pollutant distribution in a predefined vicinity of a vehicle and using, for example, an average value of pollution in an area. Alternatively, the dispersion modelling may be based on a more sophisticated methods, as detailed below. For example, a pollution level estimation model and/or measurement unit may correspond with current regulatory limit values. For example, in EU First Daughter Directive 2010 (99/30/EC), the limit for nitrogen dioxide is defined as '200 μg m-3 with no more than 18 exceedences per year'.

In this way, environmental information from a plurality of sources, for example vehicles, may be combined by the receiver device and a pollution exposure at the receiver device and/or at another pollution exposure location may be determined, for example by modelling of pollution dispersion in the environment using distances between the sources and the receiver device.

A further example aspect of the present disclosure provides a transceiver device comprising a transmitter and a receiver;

wherein the transceiver device is configured to obtain first environmental information;

wherein the transceiver device is configured to control the receiver to receive second environmental information; and wherein the transceiver device is configured to combine the first environmental information and the second environmental information.

In this way, the first environmental information obtained by the transceiver device may be combined by the transceiver device with the received second environmental information.

The first environmental information and the second environmental information may be as described previously. The transceiver device may be as described previously with respect to the transmitter device and/or the receiver device.

In an example embodiment, the transceiver device obtains the first environmental information by controlling the receiver to receive the first environmental information. In an example embodiment, the transceiver device controls the transmitter to transmit the first environmental information. For example, the transceiver device may transmit the first environmental information as described previously with respect to the transmitter device. For example, the transceiver device may forward the first environmental information. For example, the transceiver device may receive the first environmental information and the second environmental information and transmit the first environmental information and/or the second environmental information. In this way, the first environmental information and/or the second environmental information may be shared by the transceiver device.

Another example aspect of the present disclosure provides a method of transmitting environmental information, the method comprising:

obtaining first environmental information; and transmitting the first environmental information.

The first environmental information may be as described previously.

The step of obtaining the first environmental information may comprise obtaining the first environmental information from a sensor, as described previously. Additionally and/or alternatively, the step of obtaining the first environmental information may comprise obtaining the first environmental information from a vehicle ISO CAN bus or OBD port of a vehicle.

The step of transmitting the first environmental information may comprise transmitting the first environmental information as a V2X communication. The step of transmitting the first environmental information may comprise transmitting the first environmental information according to communication protocols used in C-ITS. The step of transmitting the first environmental information may comprise wirelessly transmitting the first environmental information, for example using a DSRC radio access technology, for example based on ETSI ITS-G5 or IEEE 802.11p standards. The first environmental information may be broadcast as a message or as part of a message, such as an ETSI Cooperative Awareness Message or a SAE Basic Safety Message. The first environmental information may be broadcast periodically or a periodically, or may be broadcast if an event occurs. A periodicity of broadcasting and/or content, for example type or breadth, of the first environmental information may be as described previously.

Another example aspect of the present disclosure provides a method of receiving environmental information, the method comprising:

receiving first environmental information and second environmental information; and combining the first environmental information and the second environmental information.

The first environmental information may be as described previously. The second environmental information may be similar to the first environmental information. That is, a content of the second environmental information may be as described previously with respect to the first environmental information.

The step of receiving the first environmental information and the second environmental information may comprise wirelessly receiving the first environmental information and/or the second environmental information, for example, using DSCR radio access technology, as described previously. The step of receiving the first environmental information and the second environmental information may comprise receiving the first environmental information and/or the second environmental information according to communication protocols used in C-ITS. The step of receiving the first environmental information and the second environmental information may comprise receiving the first environmental information and/or the second environmental information as a message or as part of a message, such as an ETSI Cooperative Awareness Message or a SAE Basic Safety Message.

The step of combining the first environmental information and the second environmental information may comprise mathematical processing, as described previously.

In an example embodiment, the method includes determining, for example evaluating or estimating, a pollution exposure based on the combined first environmental information and second environmental information. In an example embodiment, the method includes determining the pollution exposure, based on the combined first environmental information and second environmental information, according to a model, for example, a pollution dispersion model of the environment. The pollution exposure may be determined as described below. In an example embodiment, the method includes forwarding the determined pollution exposure, for example to a storage device and/or a remote server which may, for example, aggregate pollution exposures from different receiver devices in different locations or area. In an example embodiment, the method includes initiating an action in response to the determined pollution exposure, for example if the determined pollution exposure is above an expected or normal or predetermined value, as described previously. In an example embodiment, the method includes determining a distance from a pollution source, based on the first environmental information, the second environmental information and/or the combined first environmental information and second environmental information, as described previously.

A further example aspect of the present disclosure provides a method of transceiving environmental information, the method comprising:

obtaining first environmental information;

receiving second environmental information; and combining the first environmental information and the second environmental information.

The steps of obtaining first environmental information, receiving second environmental information and/or combining the first environmental information and the second environmental information may be as described previously.

Another example aspect of the present disclosure provides a network comprising a transmitter device and a receiver device.

The transmitter device and/or the receiver device may be as described previously.

In an example embodiment, the network comprises a plurality of transmitter devices. In an example embodiment, the network comprises a plurality of receiver devices. In an example embodiment, the network comprises a plurality of transmitter devices and a plurality of receiver devices.

Yet another example aspect of the present disclosure provides a receiver device comprising a receiver;

wherein the receiver device is configured to control the receiver to receive first environmental information; and wherein the receiver device is configured to determine a pollution exposure based on the first environmental information.

The receiver device may be as described previously with respect to receiving the first environmental information and/or to determine the pollution exposure based on the first environmental information.

Another example aspect of the present disclosure provides a method of receiving environmental information, the method comprising:

receiving first environmental information; and determining a pollution exposure based on the first environmental information.

The steps of receiving first environmental information and/or determining a pollution exposure based on the first environmental information may be as described previously.

An example of an inner structure of a transmitter device in a wireless communication system according to an embodiment of the present disclosure will be described with reference to FIG. 1.

FIG. 1 is a diagram illustrating an example of an inner structure of a transmitter device in a wireless communication system according to an example embodiment of the present disclosure.

Referring to FIG. 1, a transmitter device 10 comprises a transmitter 11. The transmitter device 10 obtains first environmental information. The transmitter device 10 may include various transmitter circuitry and is arranged to control the transmitter 11 to transmit the first environmental information. In an embodiment of the present disclosure, the transmitter device 10 may be included in, for example, a vehicle (not shown). In this way, the first environmental information may be shared by the transmitter device 10 as described above, for example, for vehicle pollution crowdsourcing.

For example, the first environmental information may include pollution information, for example, atmospheric or air pollution information related to gaseous and/or particulate matter and/or noise levels, including one or more of $CO_2$, HC, CO, PM, $NO_X$, $SO_2$, or noise, as described previously. The first environmental information includes levels of these pollutants, as described previously.

The transmitter device 10 supports, for example, and without limitation, a V2X communication including a V2V communication, a V2I communication, and a V2P communication. For example, the transmitter device may be included in a vehicle, infrastructure or a VRU device, as described previously. The transmitter device 10 controls the transmitter 11 to transmit according to communication protocols used in C-ITS, in which the communication protocols are modified to include the first environmental information. The transmitter 11 is a wireless transmitter using a DSRC radio access technology, based on ETSI ITS-G5 or IEEE 802.11p standards.

The transmitter device 10 obtains the first environmental information from a sensor (not shown), for example, at least one of various sensors such as a $CO_2$ sensor, an HC sensor, a CO sensor, a PM sensor, an $NO_X$ sensor, an $SO_2$ sensor, a noise sensor, and/or the like. The transmitter device 10 obtains the first environmental information indirectly from the at least one sensor. Particularly, the transmitter device 10 is communicatively coupled to an OBD port of the vehicle and the transmitter device 10 reads sensor values via the OBD port.

The first environmental information is broadcast by the transmitter device 10 as part of an ETSI Cooperative Awareness Message. The transmitter device 10 controls the transmitter 11 to periodically transmit the message. Additionally, the transmitter device 10 controls the transmitter 11 to transmit the message in response to a request to transmit the message. The transmitter device 10 controls the transmitter 11 to aperiodically transmit the message, or transmit the message according to occurrence of an event. The event may include any action which triggers transmitting the message.

The periodicity of broadcasting the first environmental information is to be determined by at least one of the vehicle speed, proximity of other vehicles and/or road users, vehicle location, environment type, priority or request. The transmitter device 10 transmits the first environmental information below a predetermined speed of the vehicle. The transmitter device 10 transmits the first environmental information if other vehicles and/or road users determined to be in the proximity of the vehicle. The transmitter device 10 transmits the first environmental information if a vehicle V2X modem of the vehicle receives V2X signals from other neighbouring vehicles or similar information from other on-board sensors, for example RADAR, LIDAR or camera. The transmitter device 10 transmits the first environmental information according to a map based location and/or type of environment of the vehicle. For example, the transmitter device 10 may determine that the other vehicles and/or the road users are in the proximity of the vehicle if a distance among the vehicle and the other vehicles and/or the road users is shorter than a threshold distance. The transmitter device 10 transmits the first environmental information according to a C-ITS application priority, such that a priority of the first environmental information may be reduced relative, for example, to information related to road traffic and/or safety related. The transmitter device 10 transmits the first environmental information in response to an external request. For example, in a pollution control area, V2X road infrastructure may request passing vehicles to provide the first environmental information and the first environmental information may be broadcast in response to the request.

The message transmitted by the transmitter device 10 includes additional information, including location information and/or identifier information of the transmitter device 10. In addition, the message includes safety critical or operational information, such as vehicle speed, vehicle location, vehicle acceleration, vehicle heading and/or physical vehicle parameters.

An example of an inner structure of a transmitter device in a wireless communication system according to an embodiment of the present disclosure has been described with reference to FIG. 1, and an example of an inner structure of a receiver device in a wireless communication system according to an embodiment of the present disclosure will be described with reference to FIG. 2.

Figure 2:
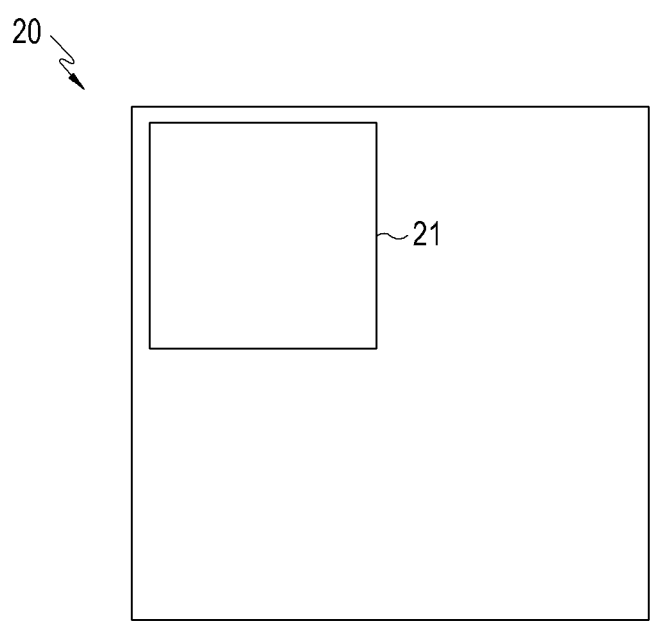
FIG. 2 is a diagram illustrating an example of an inner structure of a receiver device in a wireless communication system according to an example embodiment of the present disclosure.

FIG. 2 is a diagram illustrating an example of an inner structure of a receiver device in a wireless communication system according to an example embodiment of the present disclosure.

Referring to FIG. 2, a receiver device 20 comprises a receiver 21. The receiver device 20 controls the receiver (e.g., including various receiver circuitry) 21 to receive first environmental information and second environmental information. The receiver device 20 combines the first environmental information and the second environmental information. In an embodiment of the present disclosure, the receiver device 20 may be included in, for example, a VRU device (not shown). In this way, the first environmental information and the second environmental information may be combined by the receiver device 20, as described above. In this way, environmental information from a plurality of sources, for example vehicles, may be combined by the receiver device 20. In this way, sensors for example pollution sensors may not be required by the receiving device 20 since the first environmental information and the second environmental information is received by the receiver device 20, thereby reducing a cost and/or size of the receiving device 20. In this way, pollution exposure control may be improved, for example for VRUs.

The first environmental information is as described previously. The second environmental information is as described previously with respect to the first environmental information.

For example, the receiver device 20 supports, for example, and without limitation, V2X communication, as described previously. The first environmental information and/or the second environmental information are received as V2X communications, according to communication protocols used in C-ITS in which the communication protocols are modified to include the first environmental information and/or the second environmental information.

The receiver device 20 also includes a control unit 22 (not shown).

The receiver 21 may be a wireless receiver. The first environmental information and/or the second environmental information are received by the receiver device 20 using, for example, and without limitation, DSCR radio access technology, as described previously. The first environmental information and/or the second environmental information are received as part of an ETSI Cooperative Awareness Message.

The receiver device 20 combines the first environmental information and the second environmental information by mathematical processing the first environmental information and the second environmental information. For example, levels of $NO_X$ included in the first environmental information and the second environmental information are summed by the receiver device 20.

The receiver device 20 determines a pollution exposure based on the combined first environmental information and second environmental information. The pollution exposure is determined as described below with reference to FIG. 9. That is, a scheme of determining the pollution exposure in the receiver device 20 will be described with reference to FIG. 9, so a detailed description thereof will not be repeated herein. The receiver device 20 forwards the determined pollution exposure, for example to a storage device and/or a remote server which may, for example, aggregate pollution exposures from different receiver devices in different locations or area. The receiver device 20 initiates an action in response to the determined pollution exposure, for example if the determined pollution exposure is above an expected or normal or predetermined value provided from a storage. The receiver device 20 triggers the VRU device to display a warning to a user about a level of negative health impact, for example low/medium/high compared with normal, such that the user may change route or location to reduce or minimise pollution exposure. In FIG. 2, for example, the warning to the user about the level of the negative health impact is displayed, however, the warning may be implemented with various forms as well as visual warning. For example, the warning may be implemented with a sound form.

The receiver device 20 determines a distance from a pollution source, based on the first environmental information, the second environmental information and/or the combined first environmental information and second environmental information. The receiver device 20 determines the distance from the pollution source, for example a vehicle, according to information included in or with the first environmental information and/or the second environmental information. The receiver device 20 calculates a distance from the pollution source, based on vehicle speed, vehicle location, vehicle acceleration, vehicle heading and/or physical vehicle parameters included in the received message. The receiver device 20 may calculate a distance from the pollution source, based on speed, location, acceleration, heading and/or physical parameters related to the receiver device 20.

In this way, environmental information from a plurality of sources, for example vehicles, is combined by the receiver device 20 and a pollution exposure at the receiver device 20 and/or at another pollution exposure location may be determined, for example by modelling of pollution dispersion in the environment using distances between the sources and the receiver device 20.

An example of an inner structure of a receiver device in a wireless communication system according to an embodiment of the present disclosure has been described with reference to FIG. 2, and an example of an inner structure of a transceiver device in a wireless communication system according to an embodiment of the present disclosure will be described with reference to FIG. 3.

Figure 3:
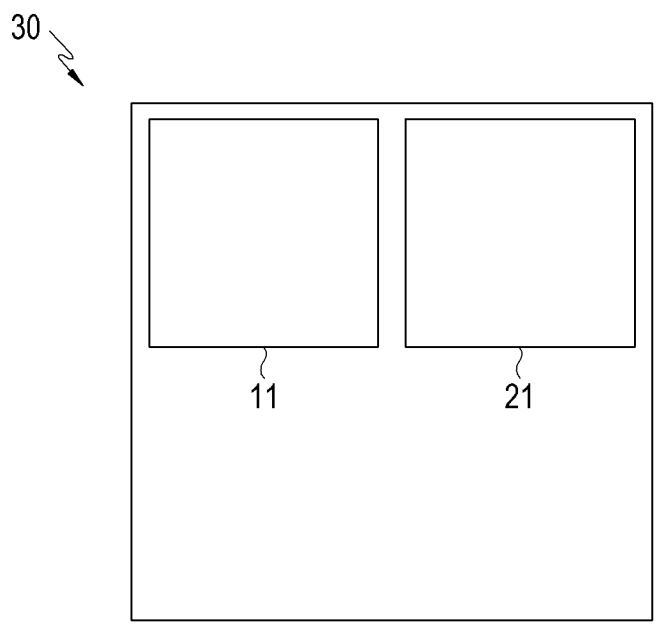
FIG. 3 is a diagram illustrating an example of an inner structure of a transceiver device in a wireless communication system according to an example embodiment of the present disclosure.

FIG. 3 is a diagram illustrating an example of an inner structure of a transceiver device 30 in a wireless communication system according to an example embodiment of the present disclosure.

Referring to FIG. 3, a transceiver device 30 comprises a transmitter (e.g., including transmitting circuitry) 11 and a receiver (e.g., including receiving circuitry) 21. The transceiver device 30 obtains first environmental information, as described previously with respect to the transmitter device 10. The transceiver device 30 controls the receiver 21 to receive second environmental information, as described previously with respect to the receiver device 20. The transceiver device 30 combines the first environmental information and the second environmental information, as described previously with respect to the receiver device 20.

For example, the first environmental information and the second environmental information are as described previously. The transceiver device 30 is as described previously with respect to the transmitter device 10 and the receiver device 20, so a detailed description thereof will not be repeated herein. In an embodiment of the present disclosure, the transceiver device 30 may be included in, for example, a vehicle (not shown). In this way, the first environmental information obtained by the transceiver device 30 may be combined by the transceiver device 30 with the received second environmental information.

The transceiver device 30 obtains the first environmental information by controlling the receiver 21 to receive the first environmental information. The transceiver device 30 controls the transmitter 11 to transmit the first environmental information. In this way, the first environmental information and the second environmental information may be shared by the transceiver device 30. In this way, the first environmental information and the second environmental information may be shared by the transceiver device 30 as described above, for example, for vehicle pollution crowdsourcing.

An example of an inner structure of a transceiver device in a wireless communication system according to an embodiment of the present disclosure has been described with reference to FIG. 3, and an example of a process of transmitting environmental information in a wireless communication system according to an embodiment of the present disclosure will be described with reference to FIG. 4.

Figure 4:
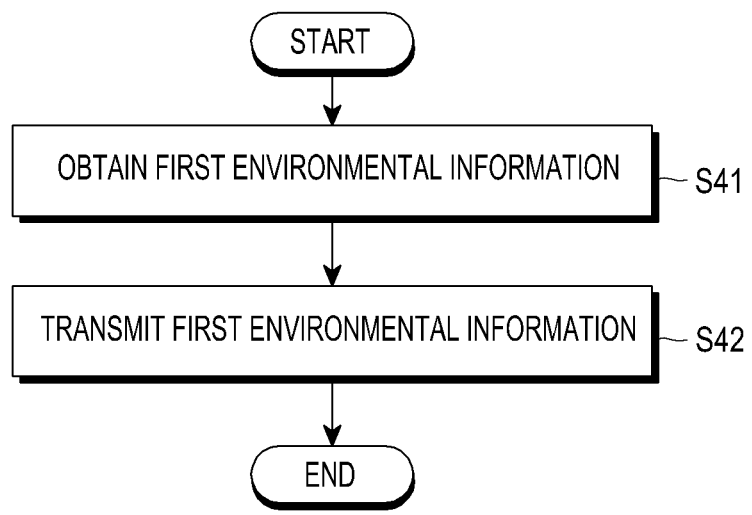
FIG. 4 is a flowchart illustrating an example process of transmitting environmental information in a wireless communication system according to an example embodiment of the present disclosure.

FIG. 4 is a flowchart illustrating an example of a process of transmitting environmental information in a wireless communication system according to an example embodiment of the present disclosure.

Referring to FIG. 4, at step S41, first environmental information is obtained, as described previously. An operation of obtaining the first environmental information has been described with reference to FIGS. 1 to 3, so a detailed description thereof will not be repeated herein. At step S42, the first environmental information is transmitted, as described previously. An operation of transmitting the first environmental information has been described with reference to FIGS. 1 to 3, so a detailed description thereof will not be repeated herein.

In this way, the first environmental information may be shared. In this way, vehicle pollution crowdsourcing may be implemented, in which, for example, coordinated utilization of multiple vehicle emission measurements may be shared within a geographic area to obtain reliable estimations of air pollutant concentrations at locations where direct measurement is not available. In addition, these measurements and/or estimations may be utilized to provide action triggers, for example, to relevant applications used by C-ITS ecosystem users such as V2X enabled devices used by vehicles, infrastructure and/or VRUs, in order to monitor, control, reduce and/or minimize human pollution exposure.

An example of a process of transmitting environmental information in a wireless communication system according to an embodiment of the present disclosure has been described with reference to FIG. 4, and an example of a process of receiving environmental information in a wireless communication system according to an embodiment of the present disclosure will be described with reference to FIG. 5.

Figure 5:
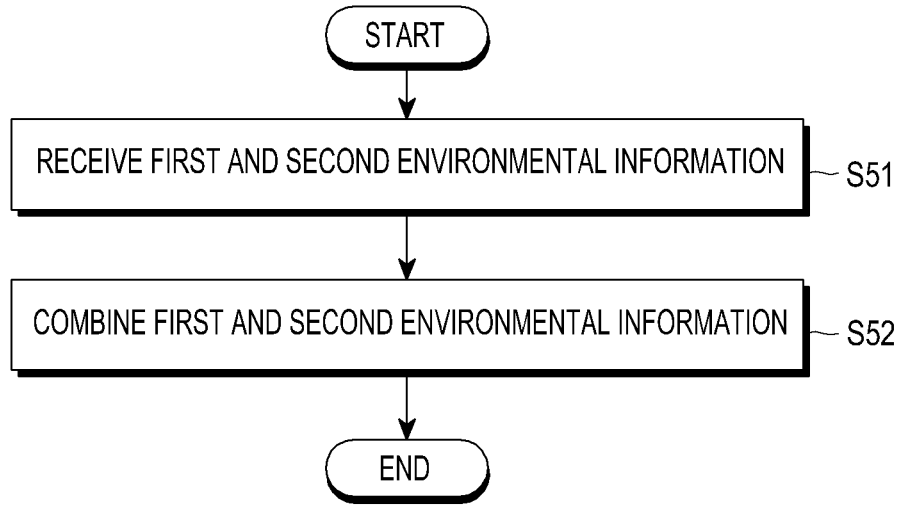
FIG. 5 is a flowchart illustrating an example process of receiving environmental information in a wireless communication system according to an example embodiment of the present disclosure.

FIG. 5 is a diagram illustrating an example of a process of receiving environmental information in a wireless communication system according to an example embodiment of the present disclosure.

Referring to FIG. 5, at step S51, first environmental information and second environmental information is received, as described previously. An operation of receiving the first environmental information and the second environmental information has been described with reference to FIGS. 1 to 3, so a detailed description thereof will not be repeated herein. At step S52, the first environmental information and the second environmental information are combined, as described previously. An operation of combining the first environmental information and the second environmental information has been described with reference to FIGS. 1 to 3, so a detailed description thereof will not be repeated herein.

In this way, environmental information from a plurality of sources, for example vehicles, may be combined. In this way, pollution exposure control may be improved, for example for VRUs.

An example of a process of receiving environmental information in a wireless communication system according to an embodiment of the present disclosure has been described with reference to FIG. 5, and an example of a process of transceiving environmental information in a wireless communication system according to an embodiment of the present disclosure will be described with reference to FIG. 6.

Figure 6:
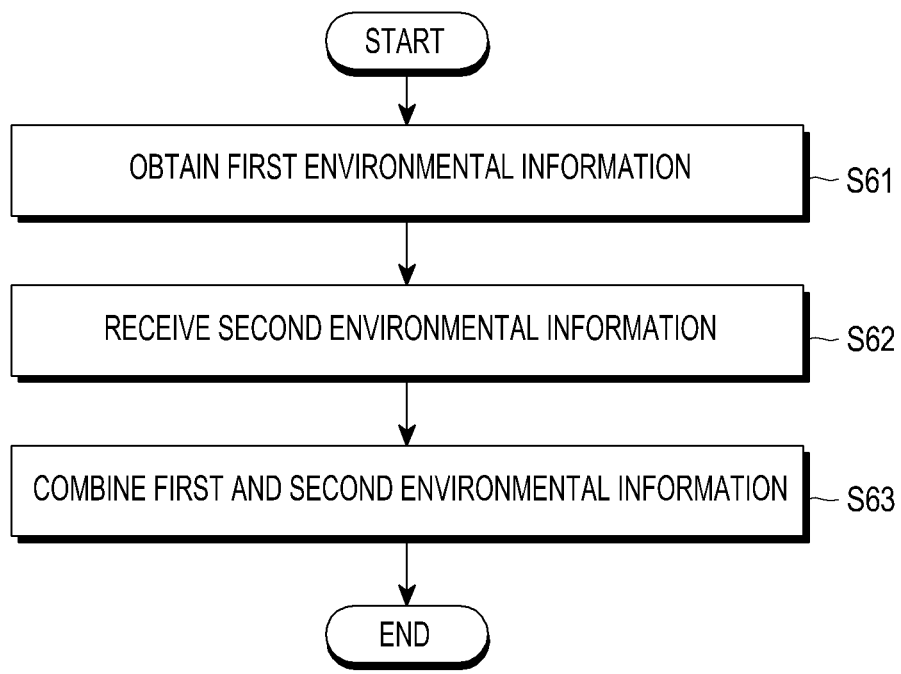
FIG. 6 is a flowchart illustrating an example process of transceiving environmental information in a wireless communication system according to an example embodiment of the present disclosure.

FIG. 6 is a flowchart illustrating an example of a process of transceiving environmental information in a wireless communication system according to an example embodiment of the present disclosure.

Referring to FIG. 6, at step S61, first environmental information is obtained. An operation of obtaining the first environmental information has been described with reference to FIGS. 1 to 3, so a detailed description thereof will not be repeated herein. At step S62, second environmental information is received. An operation of receiving the second environmental information has been described with reference to FIGS. 1 to 3, so a detailed description thereof will not be repeated herein. At step S63, the first environmental information and the second environmental information are combined. An operation of combining the first environmental information and the second environmental information has been described with reference to FIGS. 1 to 3, so a detailed description thereof will not be repeated herein.

In this way, the first environmental information obtained by the transceiver device may be combined by the transceiver device with the received second environmental information. In this way, vehicle pollution crowdsourcing may be implemented.

An example of a process of transceiving environmental information in a wireless communication system according to an embodiment of the present disclosure has been described with reference to FIG. 6, and an example of a network structure in a wireless communication system according to an embodiment of the present disclosure will be described with reference to FIG. 7.

Figure 7:
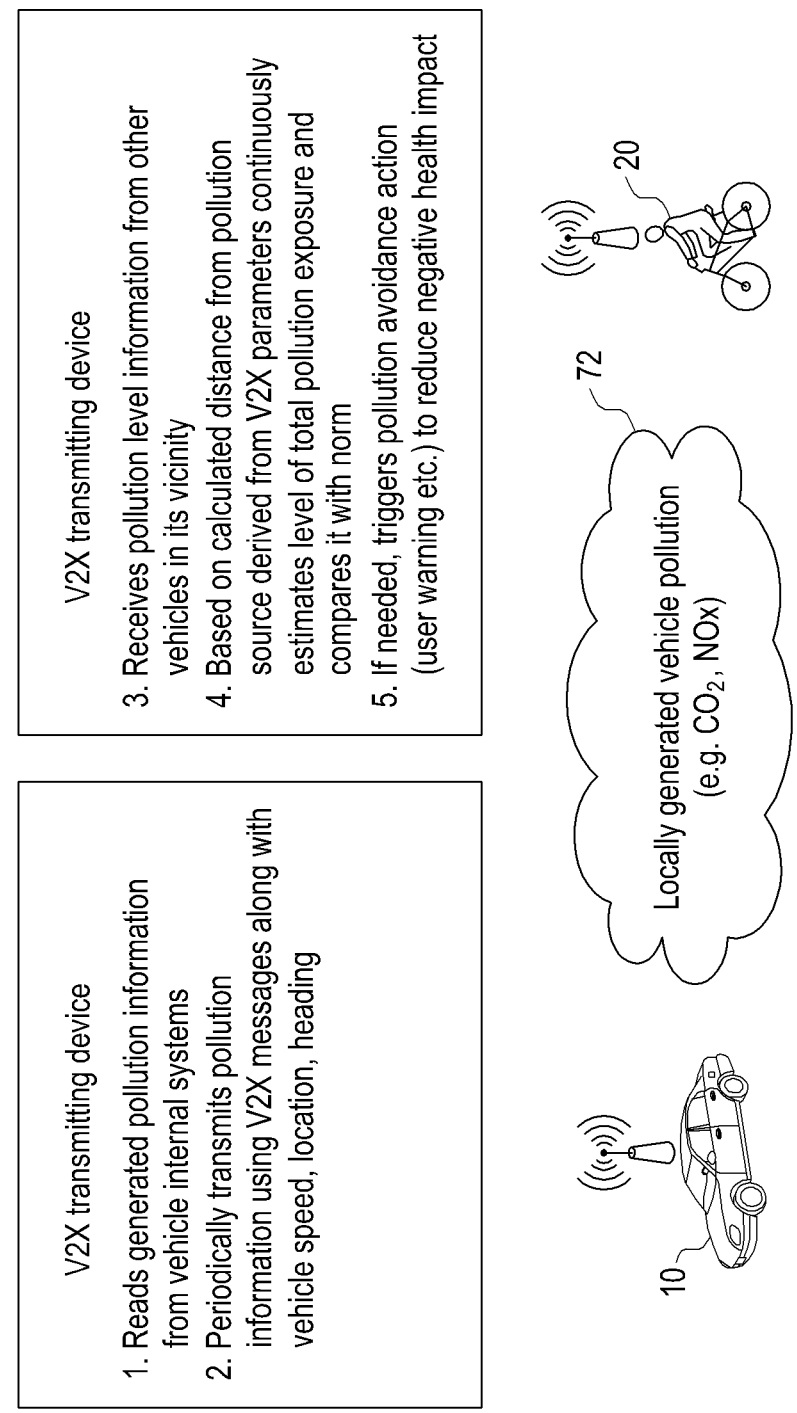
FIG. 7 is a diagram illustrating an example of a network structure in a wireless communication system according to an example embodiment of the present disclosure.

FIG. 7 is a diagram illustrating an example of a network structure in a wireless communication system according to an example embodiment of the present disclosure.

Referring to FIG. 7, it will be noted that a network structure in FIG. 7 is a structure of a network 70 including a transmitter device 10 in FIG. 1 and a receiver device 20 in FIG. 2.

Firstly, the transmitter device 10 may be included in, for example, a vehicle and the receiver device 20 may be included in, for example, a VRU device. The transmitter device 10 reads first environmental information 72 from an internal system of the vehicle via the OBD port, as described previously. The transmitter device 10 periodically or aperiodically transmits the first environmental information, or transmits the first environmental information if an event occurs, together with vehicle speed, location and heading information. The receiver device 20 receives the first environmental information, transmitted by the transmitter device 10, together with the vehicle speed, location and heading information. The receiver device 20 determines a distance between from the receiver device 20 to the transmitter device 10. The receiver device 20 determines a pollution exposure based on the first environmental information. The receiver device 20 compares the determined pollution exposure with a normal or expected value. The receiver device 20 triggers an action based on the comparison, so as to reduce a negative health impact to the VRU.

An example of a network structure in a wireless communication system according to an embodiment of the present disclosure has been described with reference to FIG. 7, and an operating process of a network in a wireless communication system according to an embodiment of the present disclosure will be described with reference to FIG. 8.

Figure 8:
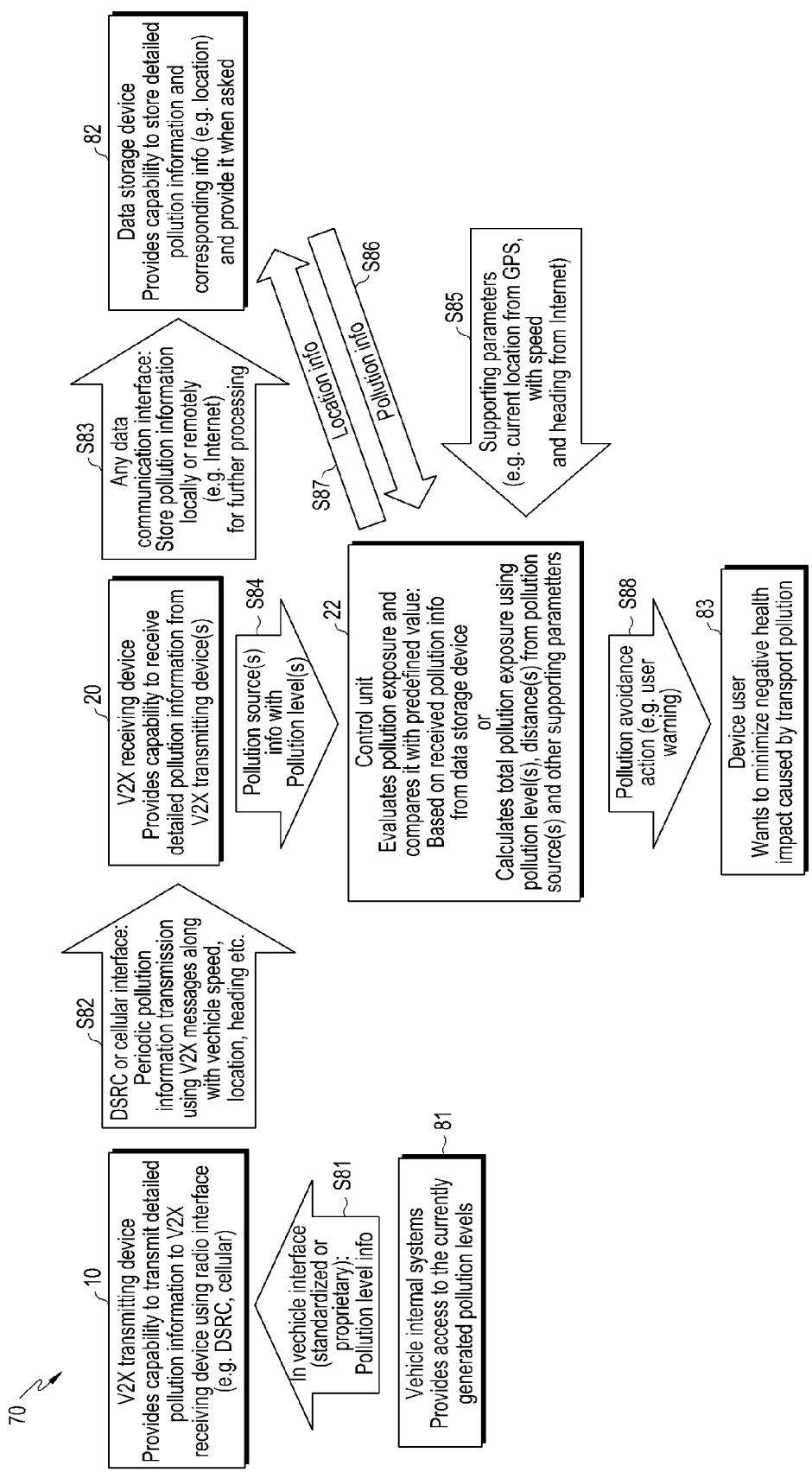
FIG. 8 is a diagram illustrating an example operating process of a network in a wireless communication system according to an example embodiment of the present disclosure.

FIG. 8 is a diagram illustrating an example operating process of a network in a wireless communication system according to an example embodiment of the present disclosure.

Referring to FIG. 8, a transmitter device 10 obtains first environmental information from a vehicle system 81 at step S81 via an interface such as an OBD port. At step S82, the transmitter device 10 transmits the first environmental information via DSRC or cellular communications as a V2X broadcast message, together with vehicle speed, location and heading information. A receiver device 20 receives the V2X broadcast message comprising the first environmental information, together with the vehicle speed, location and heading information. At step S83, the first environmental information is stored locally and/or remotely in storage 82. At step S84, the first environmental information, together with the vehicle speed, location and heading information, is used by a control unit (e.g., including processing and/or controller circuitry) 22 (which may be a part of the receiver device 20) to determine a pollution exposure. The control unit 22 may obtain additional parameters such as current location, wind speed and heading at S85, for use in determining the pollution exposure. The control unit 22 may compare the determined pollution exposure with a predefined value, such as a value provided from the storage 82 at step S86. Alternatively, the control unit 22 may determine a total pollution exposure using pollution level(s), distance(s) from pollution sources and the additional parameters. Vehicle location information is stored in the storage 82 at step S87. At step S88, a pollution avoidance action such as a warning is communicated to a user 84.

An operating process of a network in a wireless communication system according to an embodiment of the present disclosure has been described with reference to FIG. 8, and a process of modelling pollution exposure in a receiver device in a wireless communication system according to an embodiment of the present disclosure will be described with reference to FIG. 9.

FIG. 9 is a diagram illustrating an example process of modelling a pollution exposure in a receiver device in a wireless communication system according to an example embodiment of the present disclosure.

Referring to FIG. 9, pollution dispersion in an environment may be modelled mathematically and may consider, for example, gases such as $CO_2$, HC, CO, $NO_X$, $SO_2$, PM, and noise. The pollution exposure may be modelled by the receiver device 20 according to a Gaussian air pollutant dispersion equation, as described previously. In an embodiment of the present disclosure, the pollution exposure is modelled by the receiver device 20 according to a simplified Gaussian air pollutant dispersion equation, as shown in FIG. 9, according to:

http://www.ajdesigner.com/phpdispersion/point_space_equation.php#ajscr oll.

Such a model is shown schematically, for example, in:
https://en.wikipedia.org/wiki/Fundamentals_of_Stack_Gas_Dispersion.

Here, the simplified Gaussian air pollutant dispersion equation may be one of various schemes of modelling pollution exposure.

In detail, the equation presented in FIG. 9 is solved for unknown (x) to calculate a contaminant concentration at ground level along a plume centerline when an emission source is at ground level, may be determined, for example, according to:

http://www:ajdesigner.com/phpdispersion/emission_source_ground_equati on.php.

There are many dispersion models available for calculating the atmospheric pollution dispersion. The major parameters used in these models are Pollution rate emission rate (Q)
Average wind speed (u)
Y direction plum standard deviation ($\sigma y$)
Z direction plum standard deviation ($\sigma z$)
Y position y
Z position z
Effective stack height H in a buoyant Gaussian air pollutant dispersion plume.

In an embodiment of the present disclosure, main parameters used in many dispersion models available for calculating the atmospheric pollution dispersion include a pollution rate emission rate (Q), an average wind speed (u), Y direction plum standard deviation ($\sigma y$), Z direction plum standard deviation ($\sigma z$), Y position y, Z position z, and an effective stack height H in a buoyant Gaussian air pollutant dispersion plume. However, the main parameters used in many dispersion models available for calculating the atmospheric pollution dispersion are not limited to this.

Meanwhile, for example, a contaminant concentration C(x,0,0) at ground level along the plume centerline when an emission source is at ground level may be given by:

$$C(x, 0, 0) = \frac{Q}{\pi u \sigma_y \sigma_z}$$

In this equation, the receiver device 20 derives the following parameters from:
Pollution emission rate $$Q\,[\text{g/s}]$$

—value periodically received from the transmitter device 10;
Average wind speed $$u\,[\text{m/s}]$$

—computed from adding polluting vehicle speed vector (speed and heading info), vehicle exhaust speed (could be vehicle specific and either transmitted as part of V2X messages or for simplicity some typical default value could be used) and natural atmospheric wind vector (if needed); and
Y, Z directions plume standard deviation $$\sigma_y \sigma_z\,[\text{m}]$$

—may be vehicle specific and either transmitted as part of V2X messages or for simplicity some typical default value could be used.

While a dispersion model has been described, it will be appreciated that any dispersion model for stationary sources, for example stationary point sources, or non-stationary sources, for example non-stationary point sources, may be employed.

A process of modelling a pollution exposure in a receiver device in a wireless communication system according to an embodiment of the present disclosure has been described with reference to FIG. 9, and another example of a transmitter device in a wireless communication system according to an embodiment of the present disclosure will be described with reference to FIG. 10.

Figure 10:
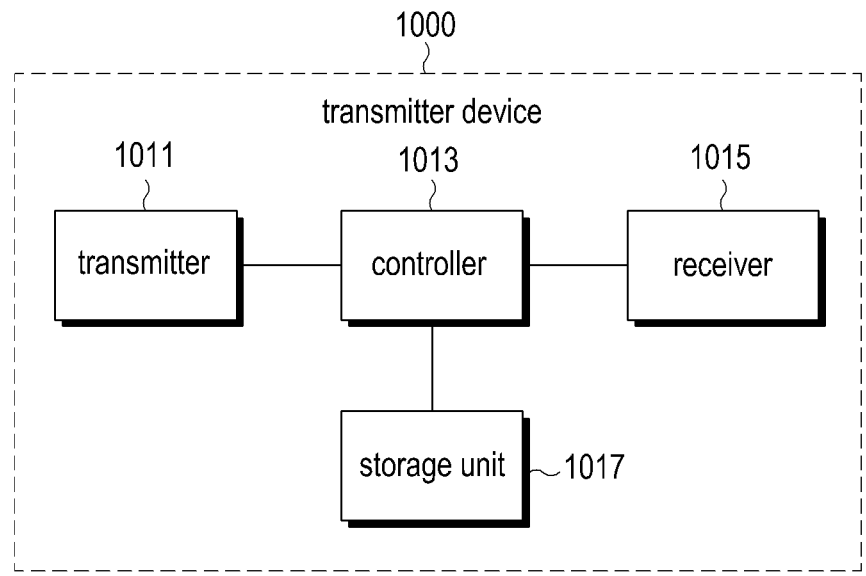
FIG. 10 is a block diagram illustrating an example of a transmitter device in a wireless communication system according to an example embodiment of the present disclosure.

FIG. 10 is a block diagram illustrating another example of a transmitter device in a wireless communication system according to an example embodiment of the present disclosure.

Referring to FIG. 10, a transmitter device 1000 includes a transmitter (e.g., including transmitting circuitry) 1011, a controller (e.g., including processing and/or controller circuitry) 1013, a receiver (e.g., including receiving circuitry) 1015, and a storage unit 1017.

The controller 1013 may include various processing and/or control circuitry and controls the overall operation of the transmitter device 1000. The controller 1013 controls an operation related to an operation of transmitting and receiving environmental information in a wireless communication system according to an embodiment of the present disclosure. The operation related to the operation of transmitting and receiving the environmental information in the wireless communication system according to an embodiment of the present disclosure has been described with FIGS. 1 to 9, and a detailed description thereof will not be repeated herein.

The transmitter 1011 may include various transmitting circuitry and transmits various signals and various messages to other devices included in the wireless communication system under a control of the controller 1013. The various signals and various messages transmitted in the transmitter 1011 have been described with reference to FIGS. 1 to 9, and a detailed description thereof will not be repeated herein.

The receiver 1015 may include various receiving circuitry and receives various signals and various messages from the other devices included in the wireless communication system under a control of the controller 1013. The various signals and various messages received in the receiver 1015 have been described with reference to FIGS. 1 to 9, and a detailed description thereof will not be repeated herein.

The storage unit 1017 stores various programs, various data, and the like related to the operation related to the operation of transmitting and receiving the environmental information performed in the transmitter device 1000 under a control of the controller 1013.

The storage unit 1017 stores the various signals and various messages which are received by the receiver 1015 from the other devices.

While the transmitter 1011, the controller 1013, the receiver 1015, and the storage unit 1017 are described in the transmitter device 1000 as separate units, however, the transmitter device 1000 may be implemented as a form that at least two of the transmitter 1011, the controller 1013, the receiver 1015, and the storage unit 1017 may be incorporated into a single unit.

The transmitter device 1000 may be implemented with at least one processor.

Another example of a transmitter device in a wireless communication system according to an embodiment of the present disclosure has been described with reference to FIG. 10, and another example of a receiver device in a wireless communication system according to an embodiment of the present disclosure will be described with reference to FIG. 11.

Figure 11:
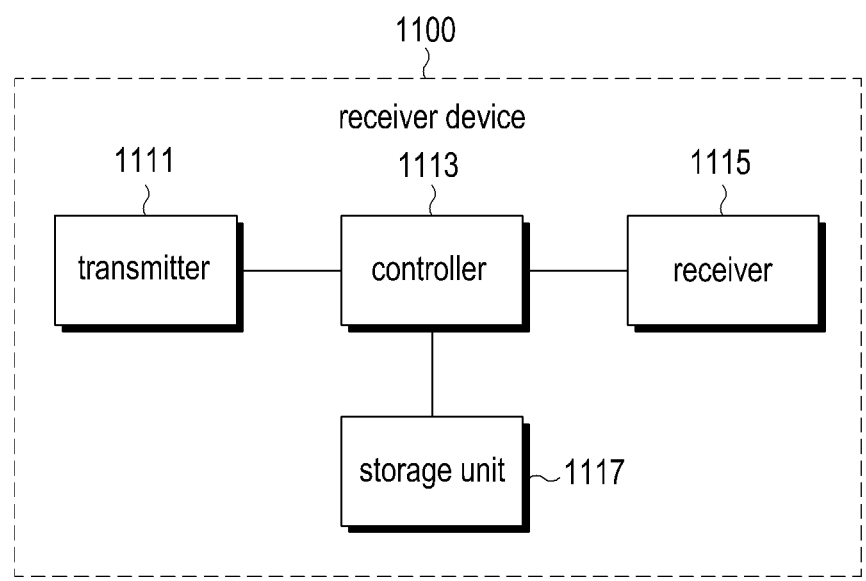
FIG. 11 is a block diagram illustrating an example of a receiver device in a wireless communication system according to an example embodiment of the present disclosure.

FIG. 11 is a block diagram illustrating another example of a receiver device in a wireless communication system according to an example embodiment of the present disclosure.

Referring to FIG. 11, a receiver device 1100 includes a transmitter (e.g., including transmitting circuitry) 1111, a controller (e.g., including processing and/or control circuitry) 1113, a receiver (e.g., including receiving circuitry) 1115, and a storage unit 1117.

The controller 1113 may include various processing and/or control circuitry and controls the overall operation of the receiver device 1100. The controller 1113 controls an operation related to an operation of transmitting and receiving environmental information in a wireless communication system according to an embodiment of the present disclosure. The operation related to the operation of transmitting and receiving the environmental information in the wireless communication system according to an embodiment of the present disclosure has been described with FIGS. 1 to 9, and a detailed description thereof will not be repeated herein.

The transmitter 1111 may include various transmitting circuitry and transmits various signals and various messages to other devices included in the wireless communication system under a control of the controller 1113. The various signals and various messages transmitted in the transmitter 1111 have been described with reference to FIGS. 1 to 9, and a detailed description thereof will not be repeated herein.

The receiver 1115 may include various receiving circuitry and receives various signals and various messages from the other devices included in the wireless communication system under a control of the controller 1113. The various signals and various messages received in the receiver 1115 have been described with reference to FIGS. 1 to 9, and a detailed description thereof will not be repeated herein.

The storage unit 1117 stores various programs, various data, and the like related to the operation related to the operation of transmitting and receiving the environmental information performed in the receiver device 1100 under a control of the controller 1113.

The storage unit 1117 stores the various signals and various messages which are received by the receiver 1115 from the other devices.

While the transmitter 1111, the controller 1113, the receiver 1115, and the storage unit 1117 are described in the receiver device 1100 as separate units, however, the receiver device 1100 may be implemented as a form that at least two of the transmitter 1111, the controller 1113, the receiver 1115, and the storage unit 1117 may be incorporated into a single unit.

The receiver device 1100 may be implemented with at least one processor.

Another example of a receiver device in a wireless communication system according to an embodiment of the present disclosure has been described with reference to FIG. 11, and another example of a transceiver device in a wireless communication system according to an embodiment of the present disclosure will be described with reference to FIG. 12.

Figure 12:
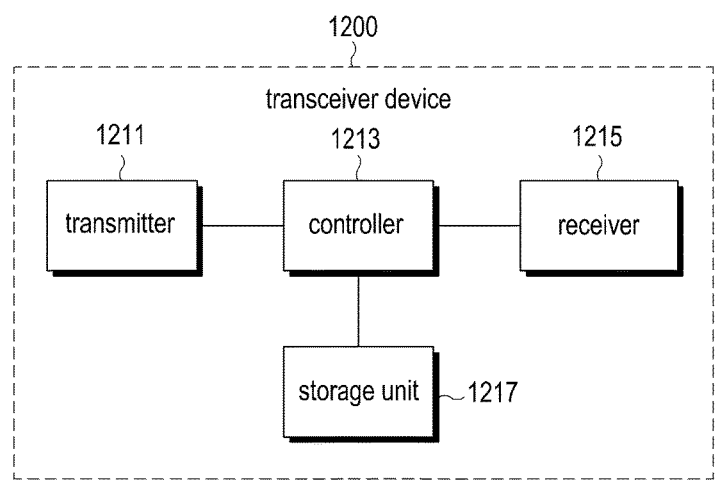
FIG. 12 is a block diagram illustrating an example of a transceiver device in a wireless communication system according to an example embodiment of the present disclosure.

FIG. 12 is a block diagram illustrating another example of a transceiver device in a wireless communication system according to an example embodiment of the present disclosure.

Referring to FIG. 12, a transceiver device 1200 includes a transmitter (e.g., including transmitting circuitry) 1211, a controller (e.g., including processing and/or control circuitry) 1213, a receiver (e.g., including receiving circuitry) 1215, and a storage unit 1217.

The controller 1213 may include various processing and/or control circuitry and controls the overall operation of the transceiver device 1200. The controller 1213 controls an operation related to an operation of transmitting and receiving environmental information in a wireless communication system according to an embodiment of the present disclosure. The operation related to the operation of transmitting and receiving the environmental information in the wireless communication system according to an embodiment of the present disclosure has been described with FIGS. 1 to 9, and a detailed description thereof will not be repeated herein.

The transmitter 1211 may include various transmitting circuitry and transmits various signals and various messages to other devices included in the wireless communication system under a control of the controller 1213. The various signals and various messages transmitted in the transmitter 1211 have been described with reference to FIGS. 1 to 9, and a detailed description thereof will not be repeated herein.

The receiver 1215 may include various receiving circuitry and receives various signals and various messages from the other devices included in the wireless communication system under a control of the controller 1213. The various signals and various messages received in the receiver 1215 have been described with reference to FIGS. 1 to 9, and a detailed description thereof will not be repeated herein.

The storage unit 1217 stores various programs, various data, and the like related to the operation related to the operation of transmitting and receiving the environmental information performed in the transceiver device 1200 under a control of the controller 1213.

The storage unit 1217 stores the various signals and various messages which are received by the receiver 1215 from the other devices.

While the transmitter 1211, the controller 1213, the receiver 1215, and the storage unit 1217 are described in the transceiver device 1200 as separate units, however, the transceiver device 1200 may be implemented as a form that at least two of the transmitter 1211, the controller 1213, the receiver 1215, and the storage unit 1217 may be incorporated into a single unit.

The transceiver device 1200 may be implemented with at least one processor.

Another example of a transceiver device in a wireless communication system according to an embodiment of the present disclosure has been described with reference to FIG. 12, and still another example of a receiver device in a wireless communication system according to an embodiment of the present disclosure will be described with reference to FIG. 13.

Figure 13:
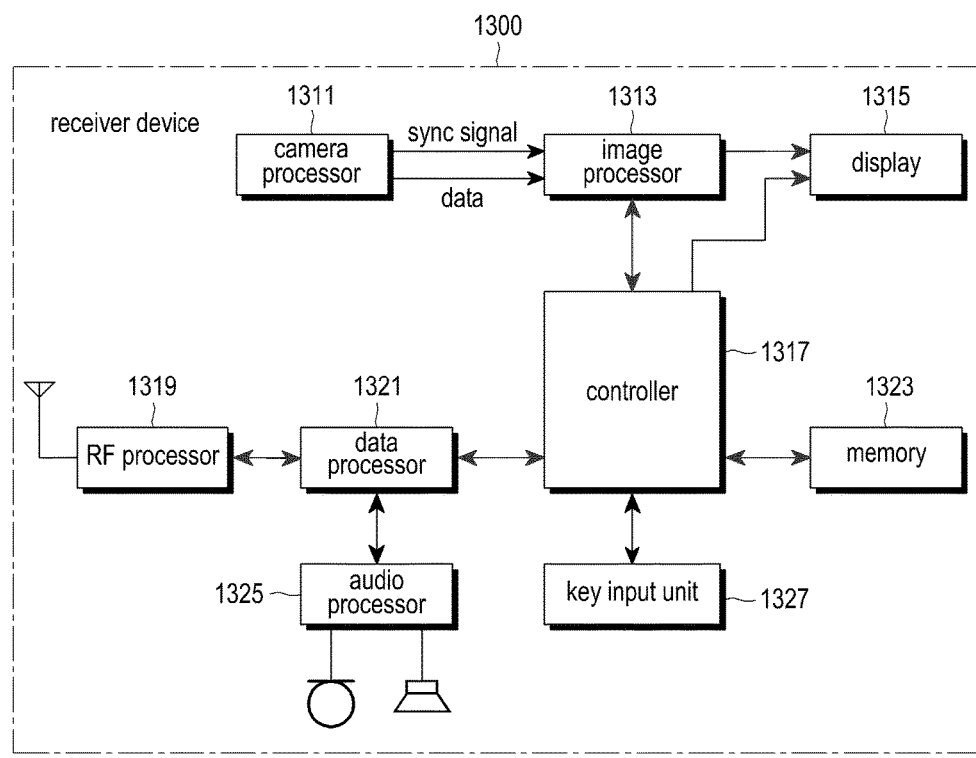
FIG. 13 is a block diagram illustrating another example of a receiver device in a wireless communication system according to an example embodiment of the present disclosure.

FIG. 13 is a block diagram illustrating still another example of a receiver device in a wireless communication system according to an example embodiment of the present disclosure.

Referring to FIG. 13, a receiver device 1300 may be connected with an external electronic device (not illustrated in FIG. 13) using at least one of a communication module (e.g., including communication circuitry), a connector, and an earphone connecting jack. The electronic device may include one of various devices which are removable from the receiver device 1300 and are connectible with the receiver device 1300 in a wired manner, such as, for example, an earphone, an external speaker, a universal serial bus (USB) memory, a charging device, a cradle/dock, a digital multimedia broadcasting (DMB) antenna, a mobile payment-related device, a health management device (a blood pressure monitor or the like), a game console, a vehicle navigation device, and so forth.

The external electronic device may be one of a wirelessly connectible Bluetooth communication device, a near field communication (NFC) device, a WiFi Direct communication device, a wireless access point (AP), etc. The receiver device 1300 may be connected with a server or another communication device such as, for example, one of a cellular phone, a smart phone, a tablet PC, a desktop PC, and a server, in a wired or wireless manner.

The receiver device 1300 includes a camera processor 1311, an image processor 1313, a display 1315, a controller (e.g., including processing and/or control circuitry) 1317, a radio frequency (RF) processor 1319, a data processor 1321, a memory 1323, an audio processor 1325, and a key input unit (e.g., including input circuitry) 1327.

The RF processor 1319 is responsible for radio communication of the receiver device 1300. The RF processor 1319 includes a RF transmitter for frequency up-converting transmission signals and amplifying the up-converted signals, and a RF receiver for low-noise-amplifying received signals and frequency down-converting the amplified signals.

The data processor 1321 includes a transmitter for encoding and modulating the transmission signals, and a receiver for demodulating and decoding the received signals. In other words, the data processor 1321 may include a modulator/de-modulator (MODEM) and a coder/decoder (CODEC). The CODEC includes a data CODEC for processing packet data, and an audio CODEC for processing audio signals such as voice.

The audio processor 1325 plays received audio signals output from the audio CODEC in the data processor 1321 using a speaker, and transfers transmission audio signals picked up by a microphone to the audio CODEC in the data processor 1321. In various embodiments of the present disclosure, the audio processor 1325 may be an outputting device for outputting at least one of information related to air pollution and information related to a noise which are estimated in the receiver device 1300. In various embodiments of the present disclosure, the audio processor 1325 may be an outputting device for outputting an action which is based on the at least one of the information related to the air pollution and the information related to the noise which are estimated in the receiver device 1300.

The key input unit 1327 includes various input circuitry, such as, for example, and without limitation, numeric/character keys for inputting numeric and character information and function keys for setting various functions.

A memory 1323 may include a program memory, a data memory, and the like. The program memory may store programs for controlling the general operation of the receiver device 1300. In accordance with an embodiment to the present disclosure, the memory 1323 may store programs related to an operation of transmitting and receiving environmental information, e.g., an environmental information combining operation and an action which is based on the environmental information. The data memory may temporarily store the data generated during execution of these programs.

The memory 1323 may be implemented as an arbitrary data storing device such as a read only memory (ROM), a random access memory (RAM), and a memory card (for example, a secure digital (SD) card, and a memory stick). The memory 1323 may include a non-volatile memory, a volatile memory, a hard disk drive (HDD), or a solid state drive (SSD).

The memory 1323 may also store applications of various functions such as navigation, video communication, games, an alarm application based on time, images for providing a graphic user interface (GUI) related to the applications, user information, documents, databases or data related to a method for processing touch inputs, background images (for example, a menu screen, a standby screen, and so forth), operation programs necessary for driving the receiver device 1300, and images captured by the camera processor 1311.

The memory 1323 is a media which is red though a machine, e.g., a computer. Here, the term "machine-readable medium" includes a medium for providing data to the machine to allow the machine to execute a particular function. The memory 1323 may include non-volatile media and volatile media. Such a medium needs to be of a tangible type so that commands delivered to the medium can be detected by a physical tool which reads the commands with the machine.

The machine-readable medium may include, but is not limited to, at least one of a floppy disk, a flexible disk, a hard disk, a magnetic tape, a compact disc read-only memory (CD-ROM), an optical disk, a punch card, a paper tape, a RAM, a programmable read-only memory (PROM), an erasable programmable read-only memory (EPROM), and a flash-EPROM.

The controller 1317 may include various processing and/or control circuitry and controls the overall operation of the receiver device 1300. The controller 1317 performs an operation related to an operation of transmitting and receiving environmental information according to an embodiment of the present disclosure. The operation related to the operation of transmitting and receiving the environmental information has been described above, so a detailed description thereof will not be repeated herein.

A camera processor 1311 includes a camera sensor for capturing images and converting the captured optical image signal into an electrical signal, and a signal processor for converting the analog image signal captured by the camera sensor into digital data. The camera sensor may be assumed to be a charge-coupled device (CCD) or complementary metal-oxide-semiconductor (CMOS) sensor, and the signal processor may be implemented with a digital signal processor (DSP). The camera sensor and the signal processor may be implemented either in an integrated way, or in a separated way.

The image processor 1313 performs image signal processing (ISP) for displaying the image signals output from the camera processor 1311 on the display 1315. The ISP may include gamma correction, interpolation, spatial variations, image effects, image scaling, automatic white balance (AWB), automatic exposure (AE), and automatic focus (AF). The image processor 1313 processes the image signals output from the camera processor 1311 on a frame-by-frame basis, and outputs the frame image data according to the characteristics and size of the display 1315. In various embodiments of the present disclosure, the display 1315 may be an outputting device for outputting at least one of information related to air pollution and information related to a noise which are estimated in the receiver device 1300. In various embodiments of the present disclosure, the display 1315 may be an outputting device for outputting an action which is based on the at least one of the information related to the air pollution and the information related to the noise which are estimated in the receiver device 1300.

The image processor 1313 includes a video codec, which compresses the frame image data displayed on the display 1315 by a preset coding scheme, and decompresses the compressed frame image data into the original frame image data. The video codec may include a joint photographic experts group (JPEG) codec, a moving picture experts group 4 (MPEG4) codec, and a Wavelet codec. The image processor 1313 is assumed to have an on-screen display (OSD) function, and may output OSD data according to the size of the displayed screen, under control of the controller 1317.

The display 1315 displays, on its screen, image signals output from the image processor 1313 and user data output from the controller 1317. The display 1315 may include, for example, and without limitation, a liquid crystal display (LCD). In this case, the display 1315 may include an LCD controller, a memory capable of storing image data, and an LCD panel. When implemented in a touch screen manner, the LCD may serve as an input unit. In this case, the same keys as those on the key input unit 1327 may be displayed on the display 1315.

If the display 1315 is implemented as the touch screen, the display 1315 outputs an analog signal, which corresponds to at least one input to a user graphic interface, to the controller 1317.

The display 1315 receives at least one user inputs through a user's body (for example, a finger including a thumb) or the key input unit 1327 (for example, a stylus pen or an electronic pen).

The display 1315 receives continuous motions on one touch (for example, a drag). The display 1315 outputs an analog signal corresponding to the continuous motions to the controller 1317.

In an example embodiment of the present disclosure, a touch may also include a non-contact touch (for example, when the user input means is positioned within a distance of, for example, 1 cm) in which the user input means may be detected without a direct contact with the display 1315. The touch may also include a direct contact between the display 1315 and a finger or the key input unit 1327. A distance or interval from the display 1315 within which the user input means may be detected may be changed according to the capability or structure of the receiver device 1300. In particular, to separately detect a direct touch event based on a contact with the user input means and an indirect touch event (that is, a hovering event), the display 1315 may be configured to output different values for values (for example, an analog voltage value or current value) detected in the direct touch event and the hovering event.

The display 1315 may be implemented as, for example, a resistive type, a capacitive type, an infrared type, an acoustic wave type, or a combination thereof.

The display 1315 may include at least two touch panels capable of sensing a touch, an approach of a finger, or the key input unit 1327 to receive inputs generated by the finger or the key input unit 1327. The at least two touch panels provide different output values to the controller 1317. Thus, the controller 1317 differently recognizes the values input from the at least two touch screen panels to identify whether the input from the display 1315 is the input generated by the finger or by the key input unit 1327.

The controller 1317 converts the analog signal received from the display 1315 into a digital signal and controls the display 1315 using the digital signal. For example, the controller 1317 may control a shortcut icon (not illustrated in FIG. 13) displayed on the display 1315 to be selected or executed in response to a direct touch event or a hovering event.

The controller 1317, by detecting a value (for example, an electric-current value) output through the display 1315, recognizes a hovering interval or distance as well as a user input position and converts the recognized distance into a digital signal (for example, a Z coordinate). The controller 1317 may also, by detecting the value output through the display 1315, detect a pressure applied by the user input means to the display 1315, and convert the detected pressure into a digital signal.

While the camera processor 1311, the image processor 1313, the display 1315, the controller 1317, the RF processor 1319, the data processor 1321, the memory 1323, the audio processor 1325, and the key input unit 1327 are shown in FIG. 13 as separate units, it is to be understood that this is for merely convenience of description. In other words, two or more of the camera processor 1311, the image processor 1313, the display 1315, the controller 1317, the RF processor 1319, the data processor 1321, the memory 1323, the audio processor 1325, and the key input unit 1327 may be incorporated into a single unit.

Alternatively, the receiver device 1300 may be implemented with one processor.

Although various example embodiments of the present disclosure have been illustrated and described, it will be appreciated by those skilled in the art that various changes and modifications might be made without departing from the scope of the present disclosure, as defined in the appended claims and as described above.

In summary, an example embodiment of the present disclosure provides a transmitter device and a receiver device. The transmitter device obtains and transmits environmental information. The receiver device receives environmental information, from one or more transmitter devices. The receiver device combines the received environmental information and may determine a pollution exposure based on the combined environmental information. In this way, an action may be taken in response to the determined pollution exposure to reduce health risks, for example.

In other words, the present disclosure provides for sharing of environmental information, such as pollution information, between devices, such as transmitter, receiver and/or transceiver devices. In addition, the shared environmental information may be combined, for example by receiver and/or transceiver devices, allowing pollution exposures to be determined. In this way, actions may be taken according to the determined pollution exposures, for example, for VRUs. In this way, the shared environmental information, depending on the application context, may be used to trigger corresponding high pollution avoidance actions aimed at reducing the negative human exposure level. In this way, new types of C-ITS applications related to VRUs, Smart Cities, Smart Mobility, mHealth, or Internet of Things may be supported, in which detailed local pollution information control or management may be required to improve transport user experience and protect health. In this way, large-scale pollution estimation in, for example, Smart Cities may be achieved and/or pollution levels may be monitored by geographic areas and/or appropriate pollution reduction mechanism triggered.

An embodiment of the present disclosure enables to transmit and receive environmental information in a wireless communication system.

An embodiment of the present disclosure enables to transmit and receive environmental information based on a plurality of environmental information sources in a wireless communication system.

An embodiment of the present disclosure enables to transmit and receive environmental information thereby enabling a vehicle crowdsourcing in which environmental information is shared in a wireless communication system.

An embodiment of the present disclosure enables to transmit and receive environmental information thereby enabling a vehicle crowdsourcing in which environmental information is shared and an action which is based on environmental information is performed in a wireless communication system.

An embodiment of the present disclosure enables to transmit and receive environmental information thereby enabling a vehicle crowdsourcing in which environmental information is shared and actions are performed in response to a pollution exposure in a wireless communication system. According to an embodiment of the present disclosure, an environment monitoring performance may be improved.

An embodiment of the present disclosure enables a receiving apparatus to estimate environmental information of the receiving apparatus based on environmental information transmitted by transmitting apparatuses in a wireless communication system.

An embodiment of the present disclosure enables to better inform, for example, vehicle drivers, passengers, and/or VRUs of pollution levels by improving monitoring of an environment, e.g., monitoring of pollution due to vehicles.

All of the features disclosed herein (including any accompanying claims and drawings), and/or all of the steps of any method or process so disclosed, may be combined in any combination, except combinations where at least some of such features and/or steps are mutually exclusive.

Each feature disclosed herein (including any accompanying claims, and drawings) may be replaced by alternative features serving the same, equivalent or similar purpose, unless expressly stated otherwise. Thus, unless expressly stated otherwise, each feature disclosed is one example only of a generic series of equivalent or similar features.

The present disclosure is not restricted to the details of the foregoing embodiment(s). The present disclosure extends to any novel one, or any novel combination, of the features disclosed herein (including any accompanying claims and drawings), or to any novel one, or any novel combination, of the steps of any method or process so disclosed.

Certain aspects of the present disclosure may also be embodied as computer readable code on a non-transitory computer readable recording medium. A non-transitory computer readable recording medium is any data storage device that can store data, which can be thereafter read by a computer system. Examples of the non-transitory computer readable recording medium include read only memory (ROM), random access memory (RAM), CD-ROMs, magnetic tapes, floppy disks, optical data storage devices, and carrier waves (such as data transmission through the Internet). The non-transitory computer readable recording medium can also be distributed over network coupled computer systems so that the computer readable code is stored and executed in a distributed fashion. In addition, functional programs, code, and code segments for accomplishing the present disclosure can be easily construed by programmers skilled in the art to which the present disclosure pertains.

It can be appreciated that a method and apparatus according to an embodiment of the present disclosure may be implemented by hardware, software and/or a combination thereof. The software may be stored in a non-volatile storage, for example, an erasable or re-writable ROM, a memory, for example, a RAM, a memory chip, a memory device, or a memory integrated circuit (IC), or an optically or magnetically recordable non-transitory machine-readable (e.g., computer-readable), storage medium (e.g., a compact disk (CD), a digital versatile disk (DVD), a magnetic disk, a magnetic tape, and/or the like). A method and apparatus according to an embodiment of the present disclosure may be implemented by a computer or a mobile terminal that includes a controller and a memory, and the memory may be an example of a non-transitory machine-readable (e.g., computer-readable), storage medium suitable to store a program or programs including instructions for implementing various embodiments of the present disclosure.

The present disclosure may include a program including code for implementing the apparatus and method as defined by the appended claims, and a non-transitory machine-readable (e.g., computer-readable), storage medium storing the program. The program may be electronically transferred via any media, such as communication signals, which are transmitted through wired and/or wireless connections, and the present disclosure may include their equivalents.

An apparatus according to an embodiment of the present disclosure may receive the program from a program providing device which is connected to the apparatus via a wire or a wireless and store the program. The program providing device may include a memory for storing instructions which instruct to perform a content protect method which has been already installed, information necessary for the content protect method, and the like, a communication unit for performing a wired or a wireless communication with a graphic processing device, and a controller for transmitting a related program to a transmitting/receiving device based on a request of the graphic processing device or automatically transmitting the related program to the transmitting/receiving device.

What is claimed is:

1. A transmitting apparatus, comprising:
communication circuitry; and
a processor configured to:
acquire information related to air pollution through at least one sensor;
control the communication circuitry to transmit the information related to the air pollution periodically or in response to occurrence of an event;
when the information related to the air pollution is periodically transmitted, identify an interval at which the information related to the air pollution is transmitted based on a speed of the transmitting apparatus; and
control the communication circuitry to transmit the information related to the air pollution periodically at the interval; and
acquire and periodically transmit traffic safety information at a higher transmission frequency than the information related to the air pollution.

2. The transmitting apparatus of claim 1, wherein the information related to the air pollution is transmitted through a message used in a broadcast protocol, and the message further includes at least one of location information, identifier information, and operation information of the transmitting apparatus.

3. The transmitting apparatus of claim 1, wherein, the interval is identified further based on a priority of the information related to the air pollution.

4. The transmitting apparatus of claim 1, wherein the communication circuitry is configured to transmit the information related to the air pollution based on a vehicle to everything (V2X) communication.

5. A receiving apparatus, comprising:
a display;
communication circuitry; and
a processor configured to:
control the communication circuitry to receive information related to air pollution from each of at least two transmitting apparatuses periodically or in response to occurrence of an event at each transmitting apparatus;
estimate information related to air pollution of the receiving apparatus based on the information related to the air pollution which is received from each of the at least two transmitting apparatuses; and
control the display to display information associated with total pollution exposure information based on the estimated information,
wherein, when the communication circuitry is configured to periodically receive the information related to the air pollution and traffic safety information, an interval at which the information related to the air pollution is received periodically is identified based on a speed of each transmitting apparatus, wherein the traffic safety information periodically received is at a higher transmission frequency than the information related to the air pollution.

6. The receiving apparatus of claim 5, wherein the information related to the air pollution-is transmitted through a message used in a broadcast protocol, and the message further includes at least one of location information, identifier information, and operation information of a corresponding transmitting apparatus.

7. The receiving apparatus of claim 5, wherein the communication circuitry is configured to receive the information related to the air pollution based on a vehicle to everything (V2X) communication.

8. The receiving apparatus of claim 5, wherein the interval is identified further based on a priority of the information related to the air pollution.

9. A method of operating a transmitting apparatus comprising:
- acquiring information related to air pollution through at least one sensor; and
- transmitting the information related to the air pollution periodically or in response to occurrence of an event;
- when the information related to the air pollution is periodically transmitted, identifying an interval at which the information related to the air pollution is transmitted based on a speed of the transmitting apparatus;
- transmitting the information related to the air pollution periodically at the interval; and
- acquiring and periodically transmitting traffic safety information at a higher transmission frequency than the information related to the air pollution.

10. The method of claim 9, wherein the information related to the air pollution is transmitted through a message used in a broadcast protocol, and the message further includes at least one of location information, identifier information, and operation information of the transmitting apparatus.

11. The method of claim 9, wherein the interval is identified further based on a priority of the information related to the air pollution.

12. The method of claim 9, wherein the information related to the air pollution is transmitted based on a vehicle to everything (V2X) communication.

13. A method of operating a receiving apparatus, comprising:
- receiving information related to air pollution from each of at least two transmitting apparatuses periodically or in response to occurrence of an event at each transmitting apparatus;
- estimating information related to air pollution of the receiving apparatus based on the information related to the air pollution which is received from each of the at least two transmitting apparatuses;
- displaying information associated with total pollution exposure based on the estimated information, and
- wherein, when the information related to the air pollution is received periodically, an interval at which the information related to the air pollution is received periodically is identified based on a speed of each transmitting apparatus, wherein traffic safety information periodically received is at a higher transmission frequency than the information related to the air pollution.

14. The method of claim 13, wherein the information related to the air pollution is transmitted through a message used in a broadcast protocol, and the message further includes at least one of location information, identifier information, and operation information of a corresponding transmitting apparatus.

15. The method of claim 13, wherein the information related to the air pollution is received based on a vehicle to everything (V2X) communication.

16. The method of claim 13, wherein the interval is identified further based on a priority of the information related to the air pollution.

17. The transmitting apparatus of claim 1, wherein the information related to the traffic safety includes location information, speed information, and heading information of the transmitting apparatus.

18. The receiving apparatus of claim 5, wherein the processor is further configured to:
- receive information related to traffic safety,
- wherein when the information related to air pollution and information related to traffic safety are received periodically, the information related to traffic safety has a higher transmission frequency than the information related to air pollution.

19. The receiving apparatus of claim 18, wherein the information related to the traffic safety includes location information, speed information, and heading information of the transmitting apparatus.

* * * * *